Figure 17:
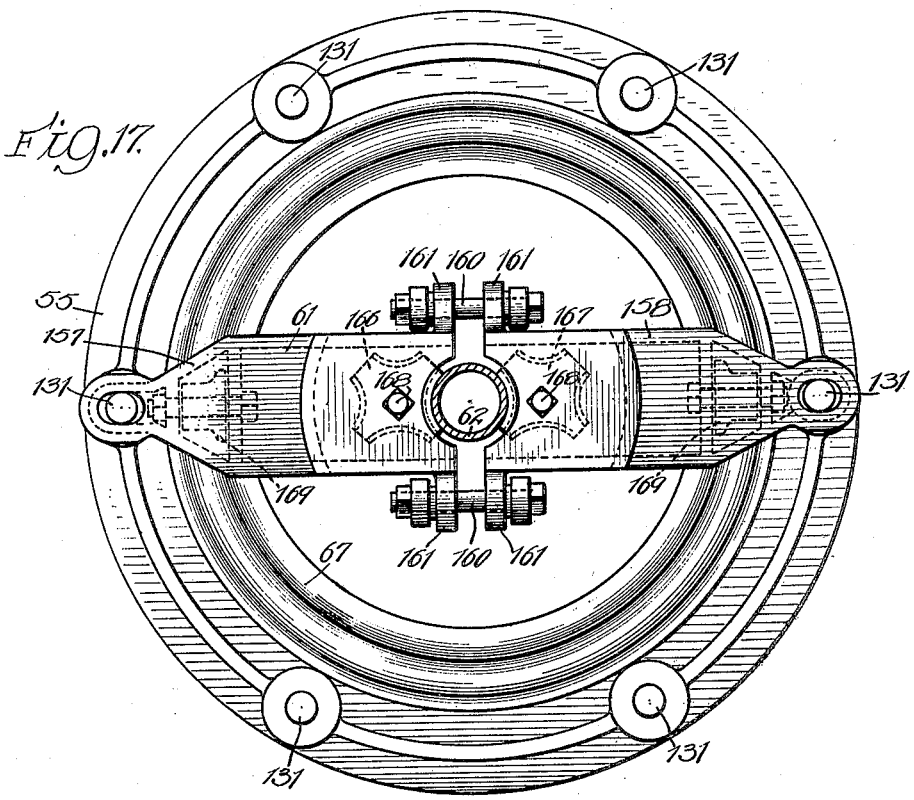

M. T. CHAPMAN.
WELL SINKING APPARATUS.
APPLICATION FILED APR. 14, 1913.
1,104,409.
Patented July 21, 1914.
14 SHEETS—SHEET 1.
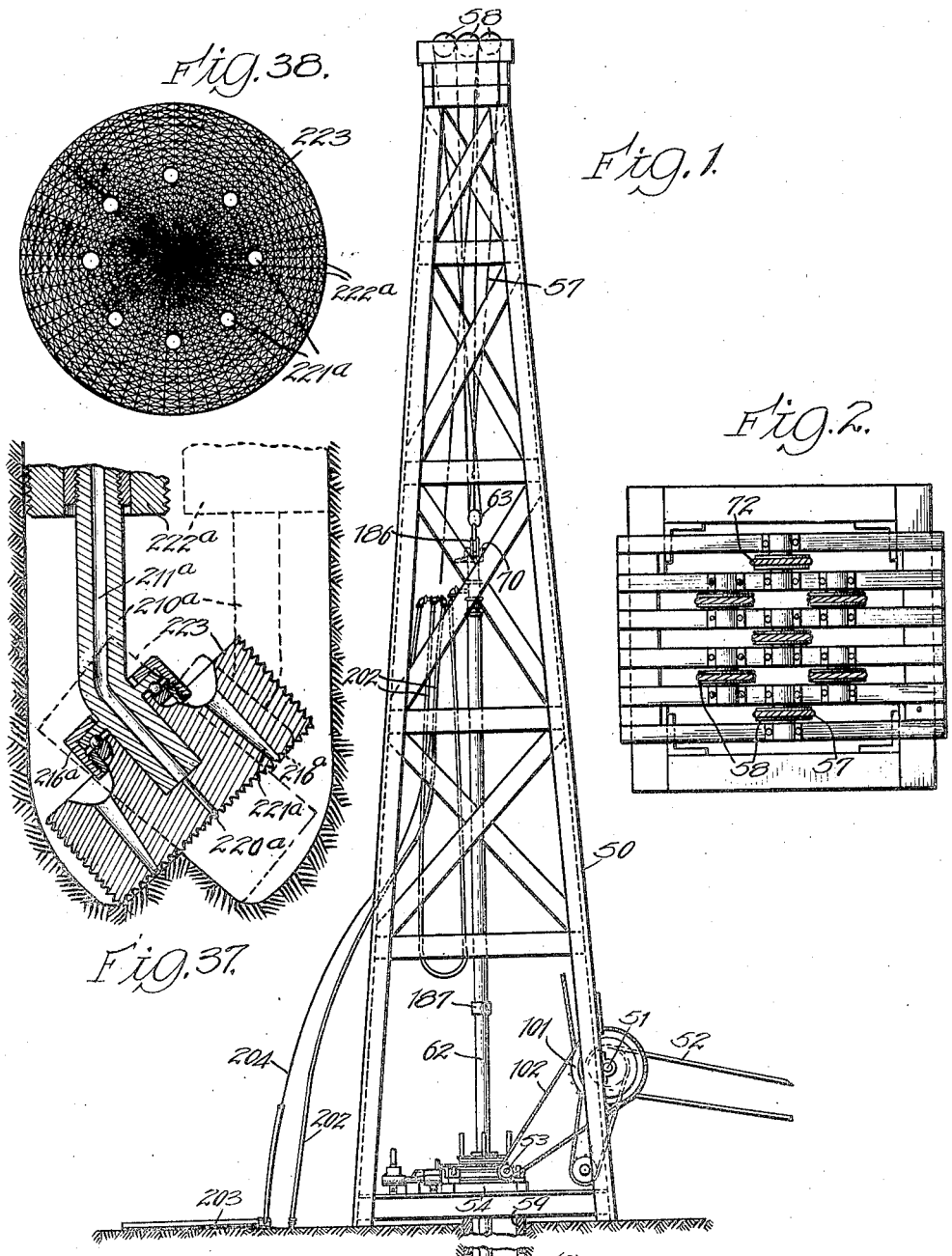

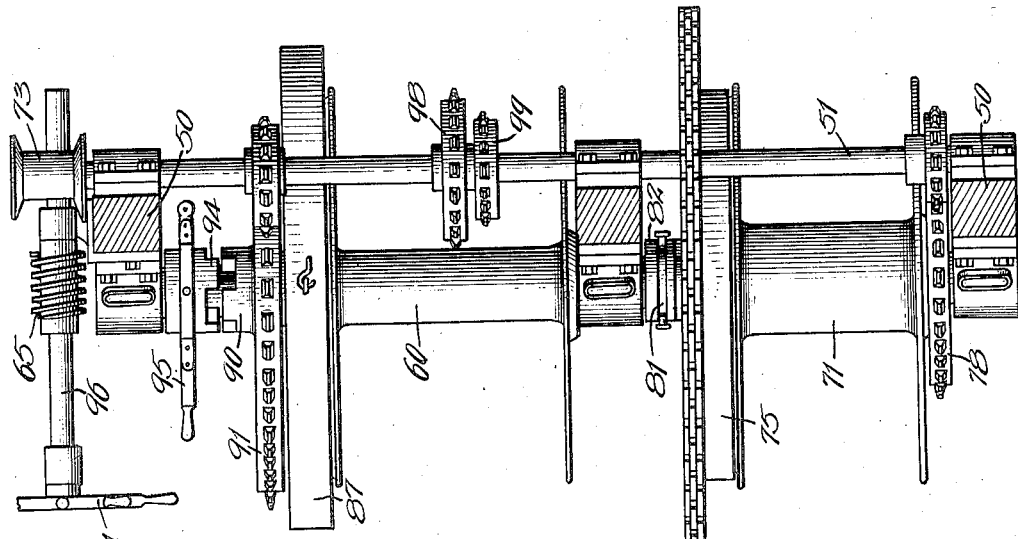

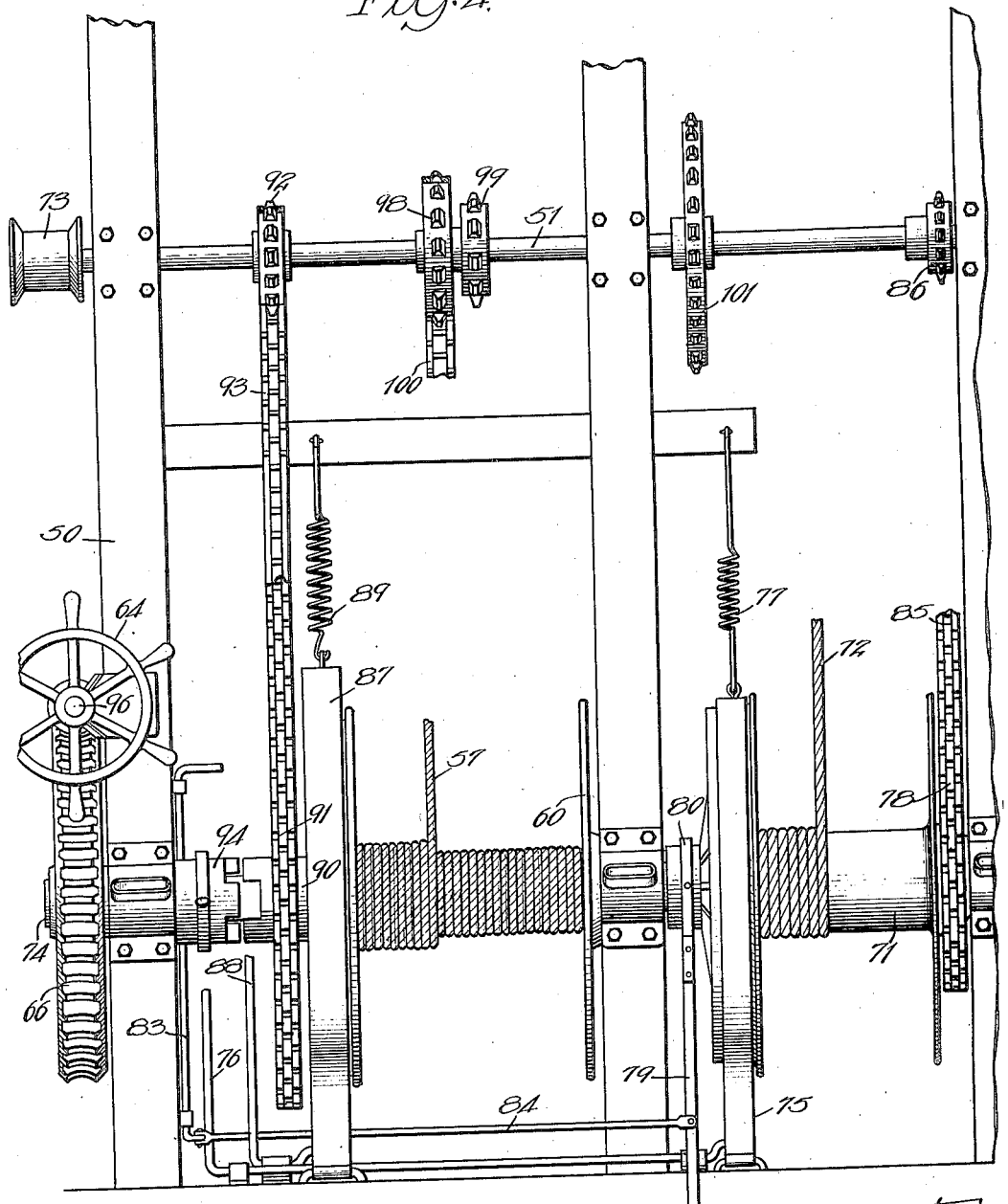

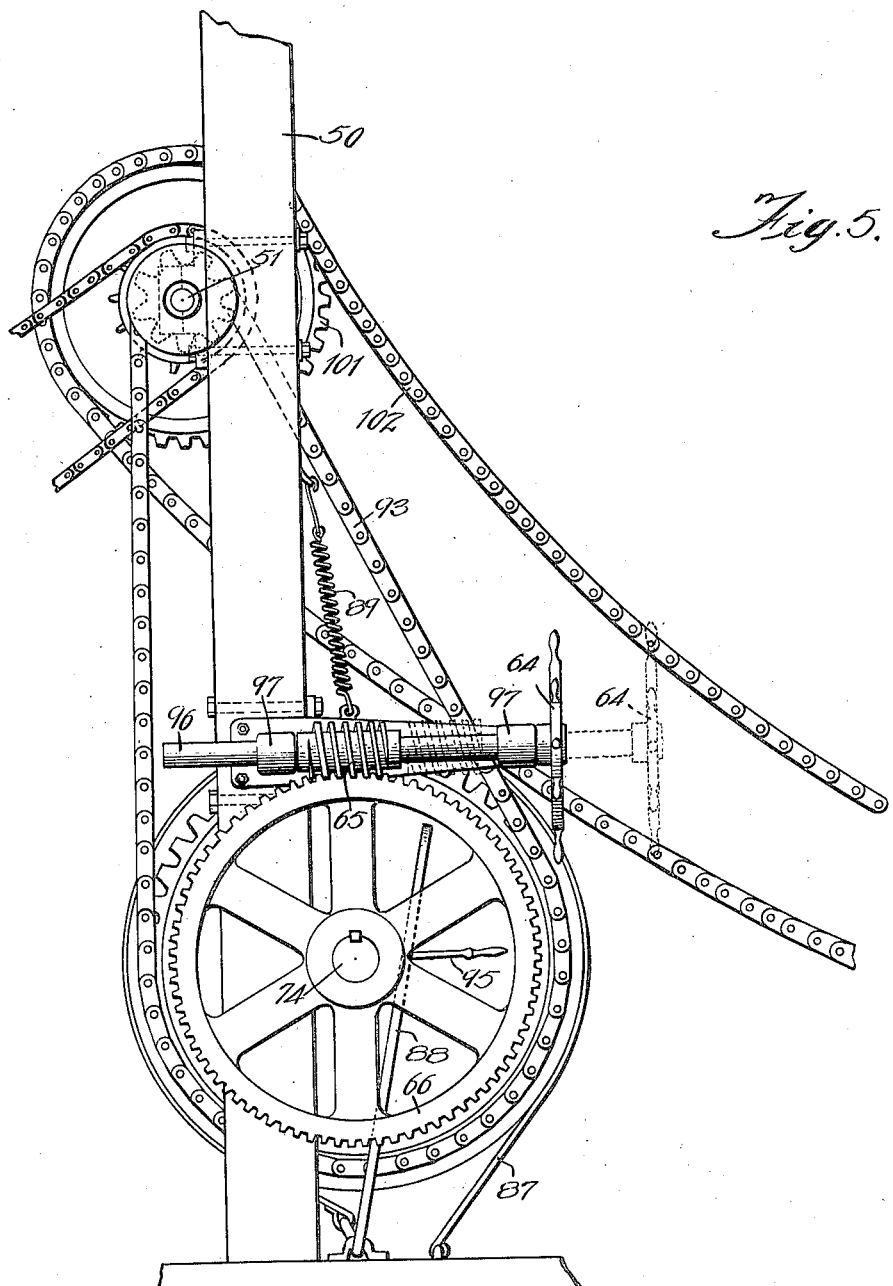

M. T. CHAPMAN.
WELL SINKING APPARATUS.
APPLICATION FILED APR. 14, 1913.
1,104,409. Patented July 21, 1914.
14 SHEETS—SHEET 5.
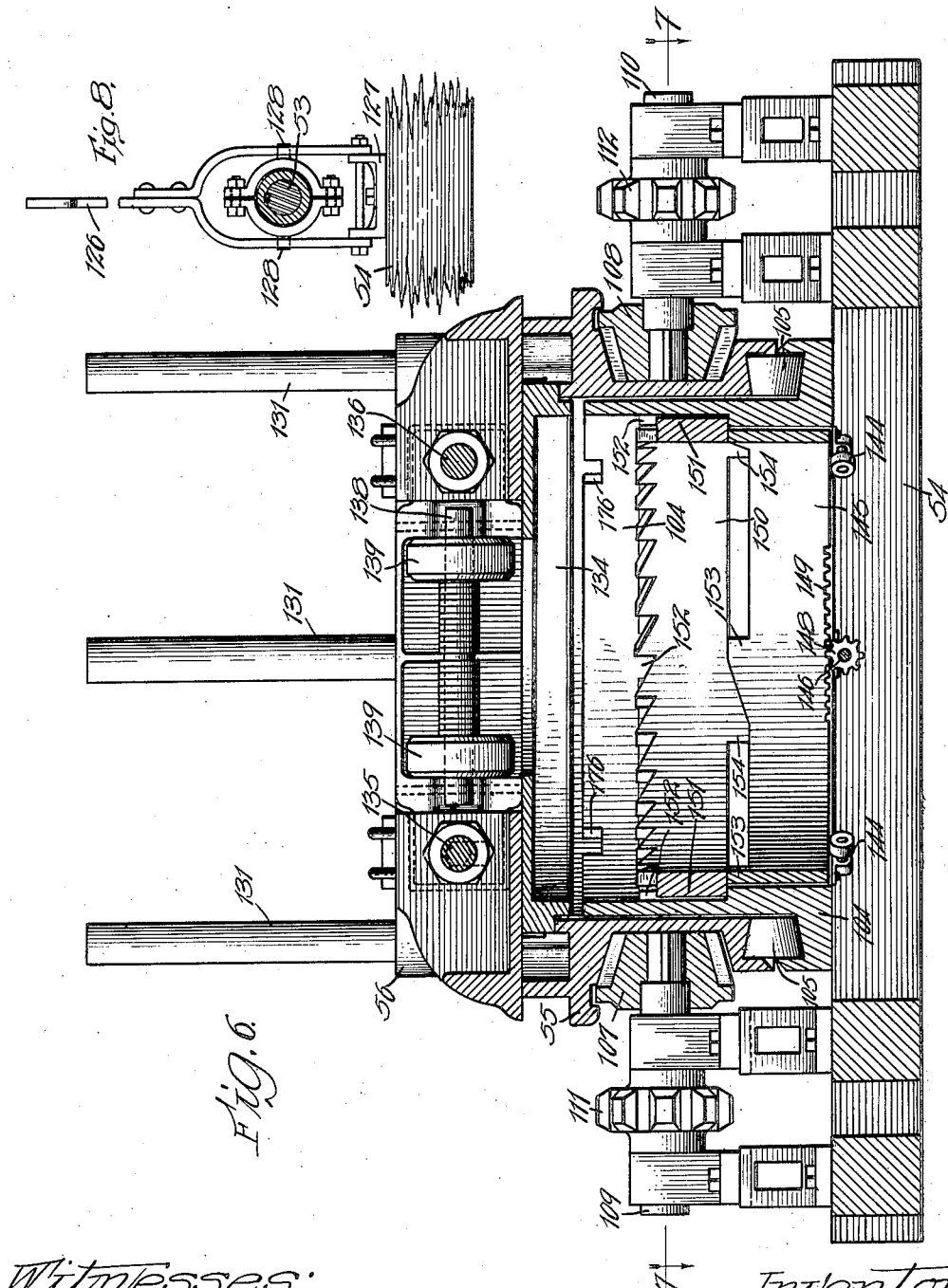

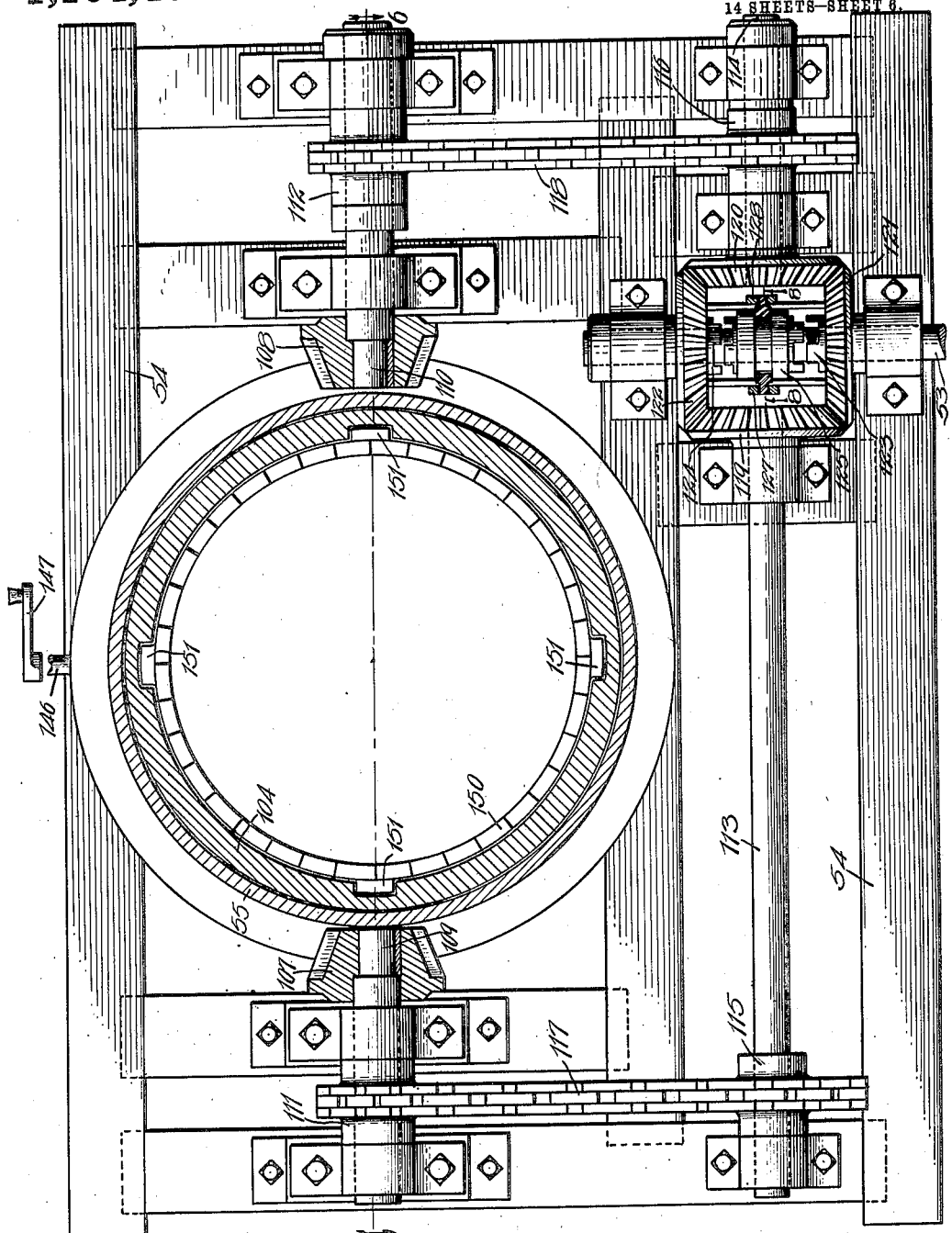

M. T. CHAPMAN.
WELL SINKING APPARATUS.
APPLICATION FILED APR. 14, 1913.
1,104,409.
Patented July 21, 1914.
14 SHEETS—SHEET 7.
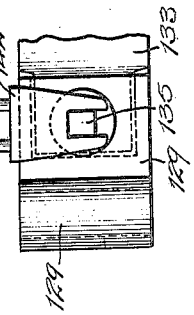
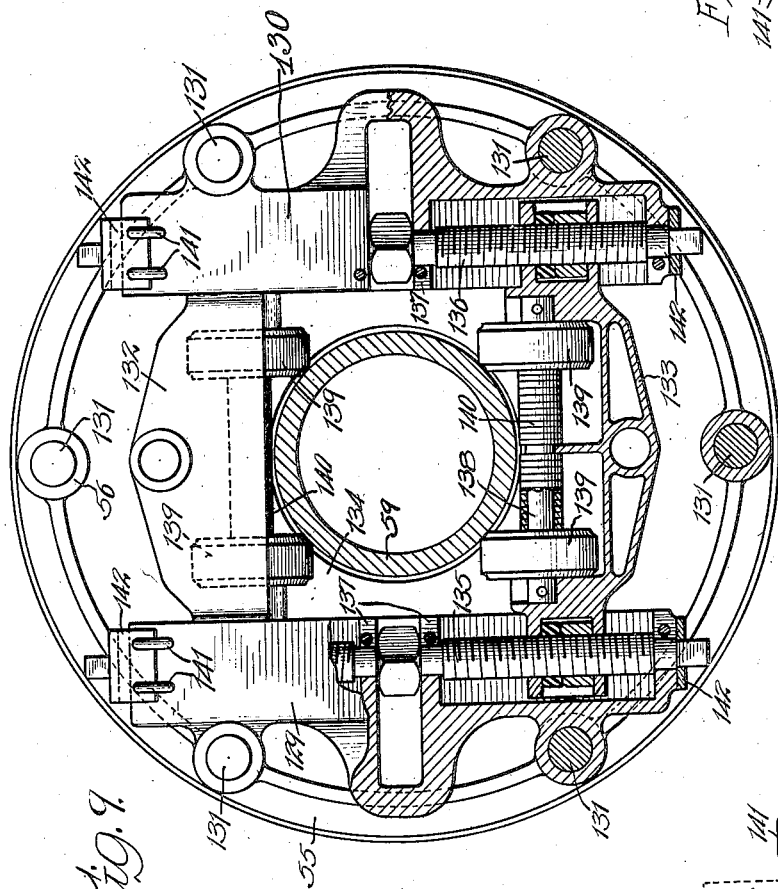
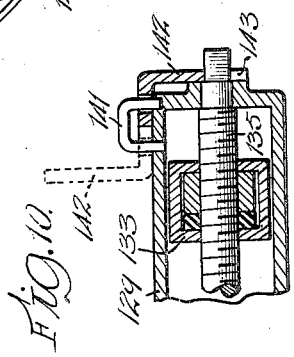

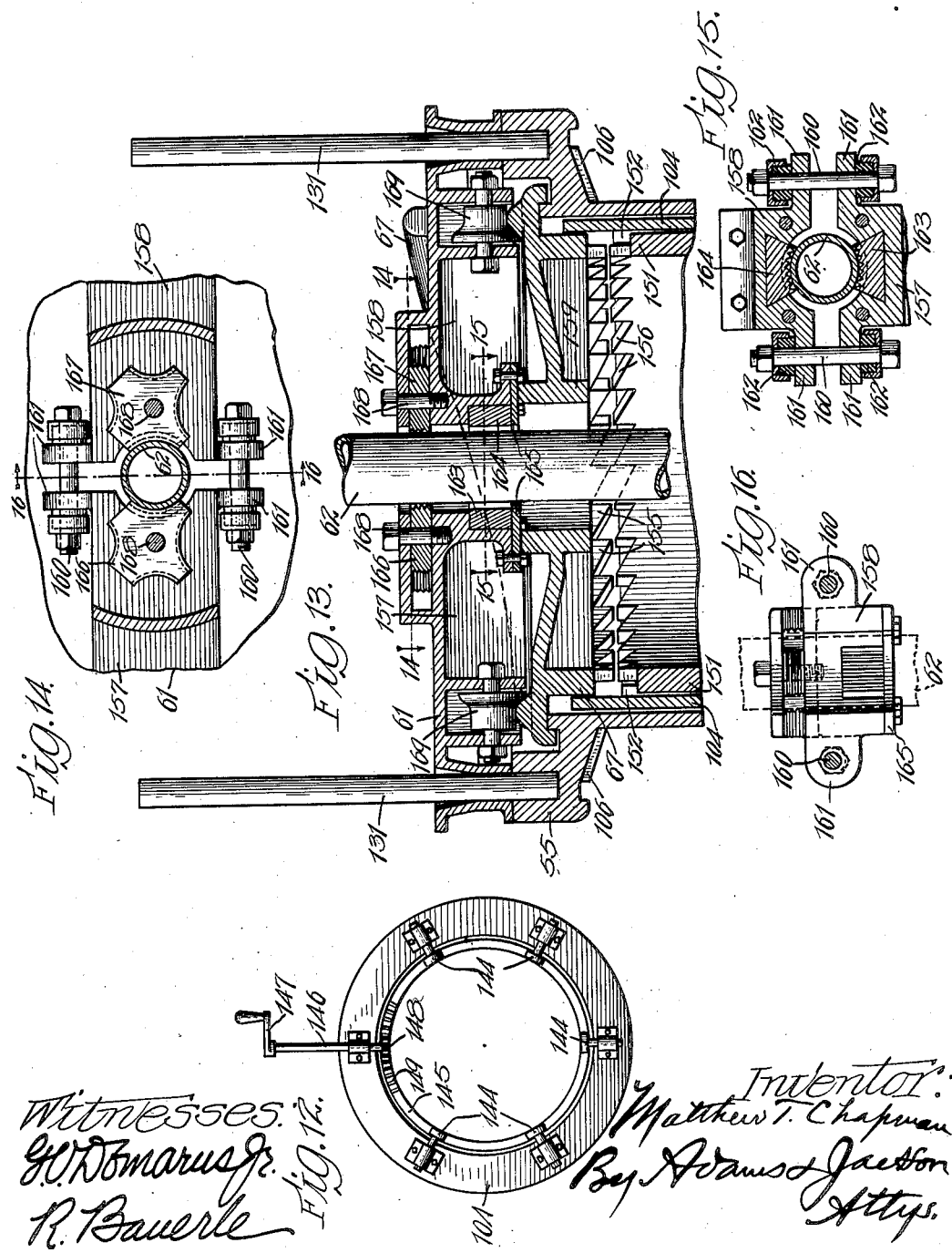

M. T. CHAPMAN.
WELL SINKING APPARATUS.
APPLICATION FILED APR. 14, 1913.
1,104,409.
Patented July 21, 1914.
14 SHEETS—SHEET 10.
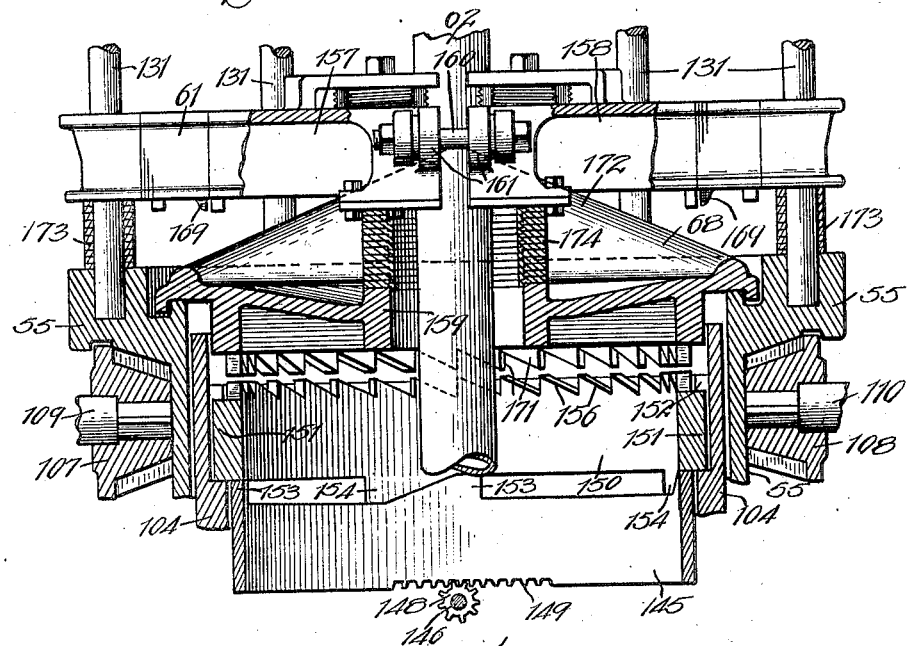
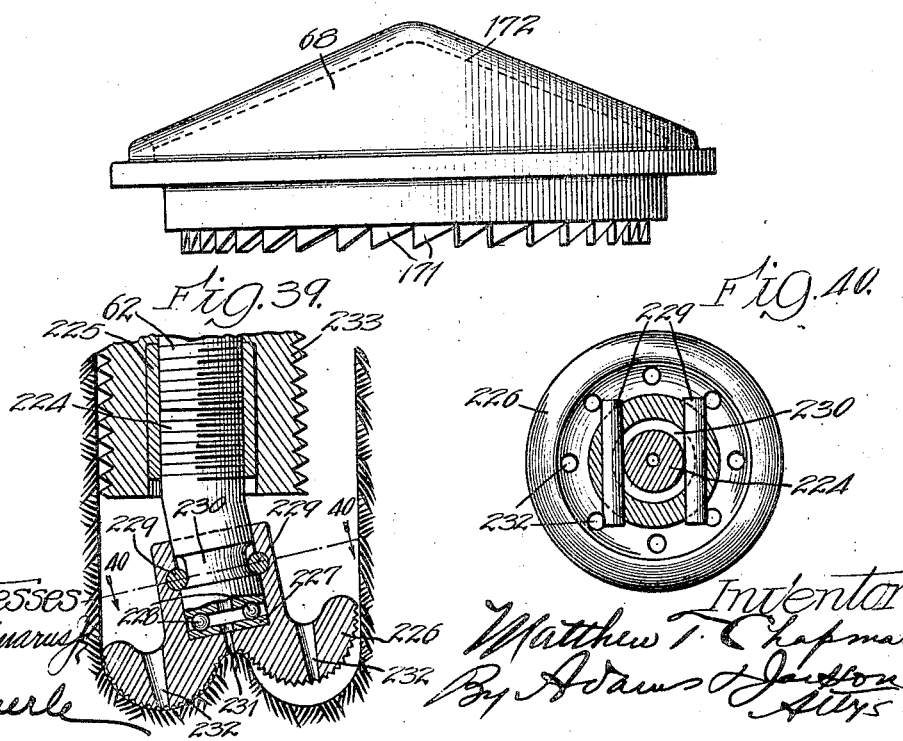

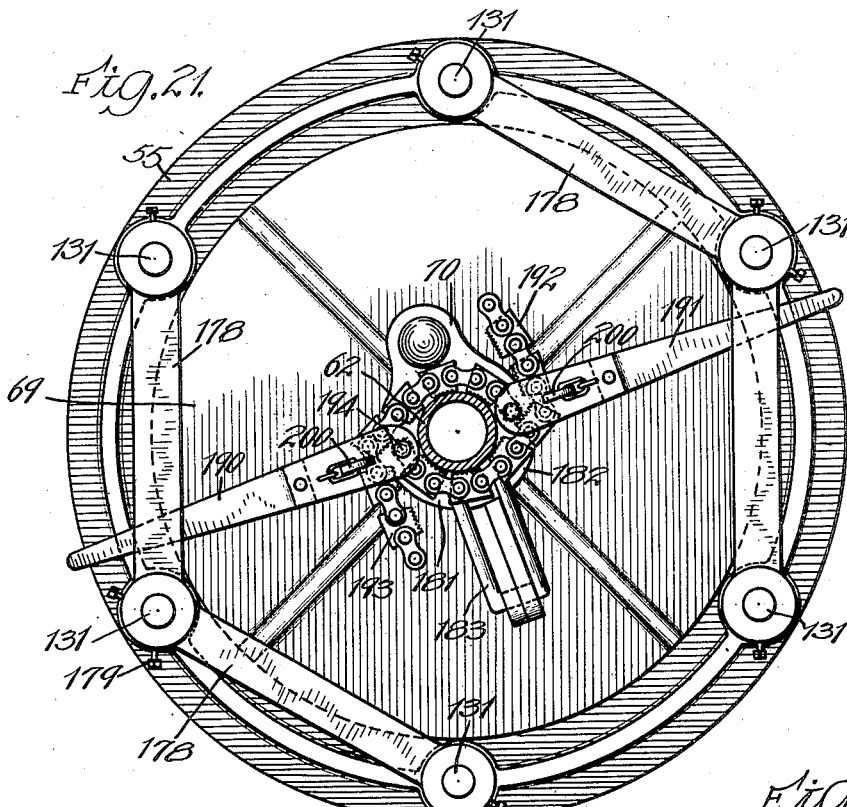
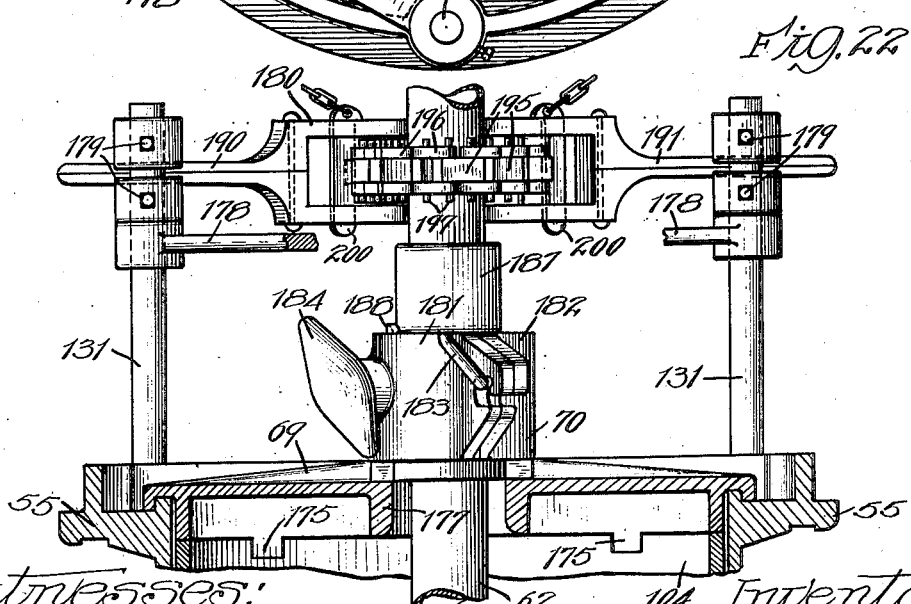

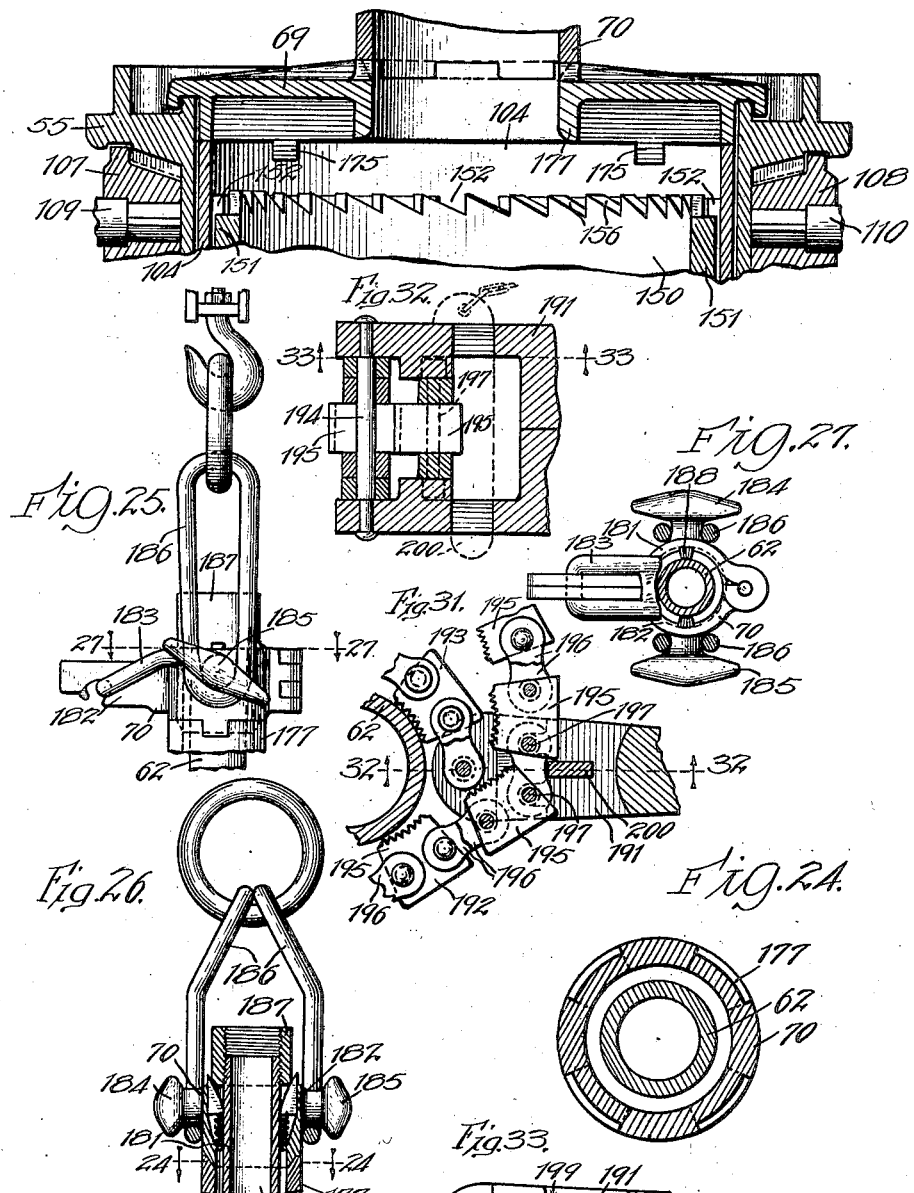

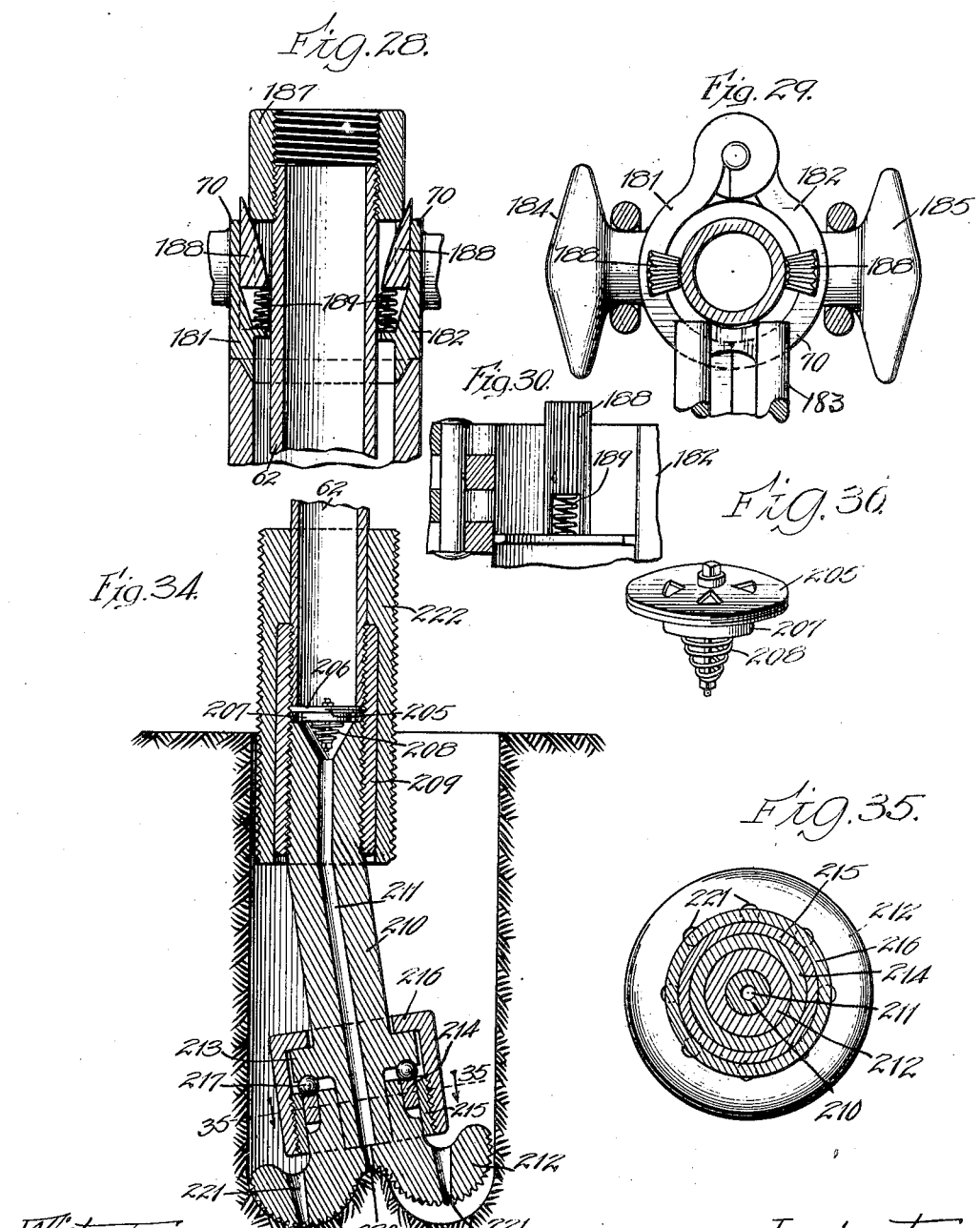

M. T. CHAPMAN.
WELL SINKING APPARATUS.
APPLICATION FILED APR. 14, 1913.
1,104,409.
Patented July 21, 1914.
14 SHEETS—SHEET 14.
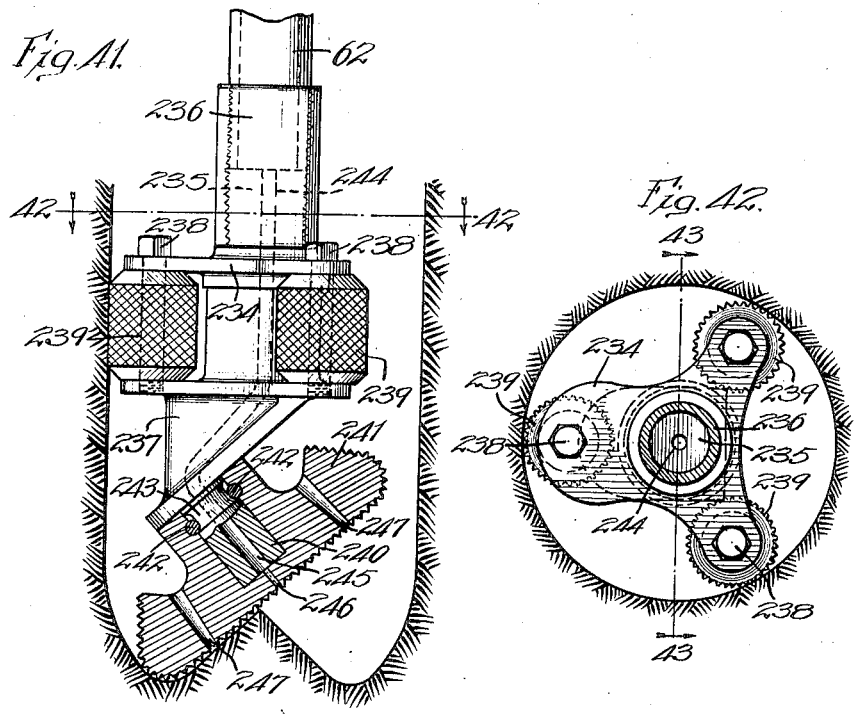
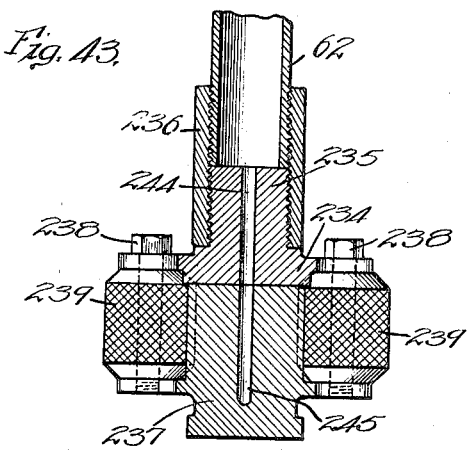

UNITED STATES PATENT OFFICE.

MATTHEW T. CHAPMAN, OF AURORA, ILLINOIS, ASSIGNOR TO THE AMERICAN WELL WORKS, OF AURORA, ILLINOIS, A CORPORATION OF ILLINOIS.

WELL-SINKING APPARATUS.

1,104,409.

Specification of Letters Patent. Patented July 21, 1914.

Application filed April 14, 1913. Serial No. 761,006.

*To all whom it may concern:*

Be it known that I, MATTHEW T. CHAPMAN, a citizen of the United States, residing at Aurora, in the county of Kane, in the State of Illinois, have invented certain new and useful Improvements in Well-Sinking Apparatus, of which the following is a specification, reference being had to the accompanying drawings.

This invention relates to well sinking apparatus and has for one of its objects the production of new and improved means for operating and controlling the boring pipe whereby it may be rotated with the proper pressure upon it.

More particularly it is one of the objects of my invention to provide one mechanism for controlling the pressure of the boring pipes down in the well and to provide auxiliary means for raising and lowering the boring pipes independently of the first-mentioned controlling means whereby the pipe may be raised and lowered as desired without disturbing the ordinary controlling mechanism.

It is another object of my invention to provide auxiliary means of the type just above described such that the boring pipe may be raised gradually and dropped, either permitting the entire weight of the boring pipes to drop onto the drill or only a certain desired proportion thereof, this jumping of the boring pipe being accomplished during the continued rotation of the pipe.

It is another object of this invention to provide auxiliary means of this same type such that the boring pipe may be raised gradually and thereafter gradually lowered during its continued rotation.

It is another object of my invention to provide an improved clamping means for rotating the pipe when the auxiliary means above described are used whereby the pipe may be properly rotated and may be lifted when desired by the clamping means, but whereby the boring pipe shall be free to move downward through the clamping means as the boring progresses.

It is another object of my invention to provide new and improved means for driving the rotary whereby the power may be applied thereto to the best advantage.

It is another object of my invention to provide a new and improved arrangement of clamping means to be carried by one of the turntables adapted to be mounted upon the rotary for the rotation of boring pipes or well casing pipes of comparatively large diameter.

More particularly my invention relates to the provision of housings for the screws which operate such clamping means, and to the provision of locking means for preventing the gradual loosening of the clamping means.

It is another object of my invention to provide new and improved means adapted to be mounted upon the rotary for use in unscrewing and removing the boring pipe from the well or for screwing them together and lowering them into the well.

It is another object of my invention to improve well sinking apparatus in sundry details hereinafter pointed out.

The means by which I have accomplished these results are illustrated in the drawings and are hereinafter specifically described. That which I believe to be new and wish to cover by this application is set forth in the claims.

Figure 18:
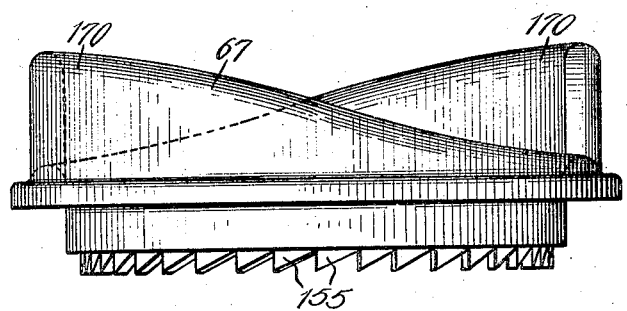

In the drawings,—Figure 1 is a view of a well sinking apparatus embodying some of my improvements; Fig. 2 is a view showing the arrangement of the pulleys at the top of the derrick; Fig. 3 is a plan view of the apparatus at the top of the well; Fig. 4 is a side elevation of the system of drums by which the cables are controlled and operated for holding the boring devices in suspension or for lowering them into or taking them out of the well; Fig. 5 is an end view of the parts shown in Fig. 4; Fig. 6 is a central vertical section through the rotary and the turntable mounted thereon, being substantially a section on line 6—6 of Fig. 7; Fig. 7 is a horizontal section through the rotary, being substantially a section on line 7—7 of Fig. 6; Fig. 8 is a cross section taken on line 8—8 of Fig. 7; Fig. 9 is a plan view partly in section of the turntable shown in Fig. 6; Fig. 10 is a vertical cross section through the end of one of the housings for the screws by which the pipe clamps are tightened, showing the means for locking the screw against rotation, and showing said locking means in dotted lines in inoperative position; Fig. 11 is a view of the parts shown in Fig. 10 as seen from the right in that figure; Fig. 12 is a bottom plan view of the base-plate; Fig. 13 is a central vertical section through the upper part of the rotary and through the turntable mounted thereon for rotating a moderate sized boring pipe; Fig. 14 is a cross section taken on line 14—14 of Fig. 13; Fig. 15 is a cross section taken on line 15—15 of Fig. 13; Fig. 16 is a section taken substantially on line 16—16 of Fig. 14; Fig. 17 is a top view of the parts shown in Fig. 13; Fig. 18 is an elevation of the cam adapted to be used with the turntable shown in Fig. 17 for jumping the boring pipe; Fig. 19 is a central vertical section through the rotary equipped with the turntable shown in Fig. 17 provided with a cam which raises and lowers the boring pipe, but does not jump it; Fig. 20 is an elevation of the cam member shown in Fig. 19; Fig. 21 is a top plan view of the turntable adapted to be used with the rotary for unscrewing the sections of the boring pipe, for removing it from the well, or for screwing said sections together when the boring pipe is to be replaced in the well; Fig. 22 is a central vertical section through the parts shown in Fig. 21; Fig. 23 is a central vertical section through substantially the same parts shown in Fig. 22, but with the boring pipe and the wrenches omitted therefrom; Fig. 24 is a cross section through the lower end of the elevator or device by which the boring pipe is raised, being substantially a section on line 24—24 of Fig. 26; Fig. 25 is a side view of the elevator; Fig. 26 is a central vertical section through the elevator; Fig. 27 is a horizontal section through the elevator, being substantially a section on line 27—27 of Fig. 25; Fig. 28 is an enlarged detail, being a central vertical section through the elevator, showing the means carried by the elevator for gripping the pipe; Fig. 29 is an enlarged detail, being a cross section through the elevator and the pipe gripped thereby; Fig. 30 is a central vertical section through the elevator at right angles to the section shown in Fig. 28; Fig. 31 is an enlarged detail showing the manner of mounting the gripping chains in the improved wrench shown in Fig. 21; Fig. 32 is an enlarged detail, being substantially a section on line 32—32 of Fig. 31; Fig. 33 is an enlarged detail, being substantially a section on line 33—33 of Fig. 32; Fig. 34 is a central vertical section through the lower end of the boring rod equipped with my improved boring tool; Fig. 35 is a cross section taken on line 35—35 of Fig. 34; Fig. 36 is a perspective view of the valve located at the lower end of the boring rod; Fig. 37 is a central vertical section through a modified form of boring tool; Fig. 38 is a view of the bottom of the drill shown in Fig. 37; Fig. 39 is a central vertical section through still another form of drill; Fig. 40 is a cross section taken on line 40—40 of Fig. 39; Fig. 41 is a central vertical section through still another modified form of drill; Fig. 42 is a section on line 42—42 of Fig. 41; and Fig. 43 is a section on line 43—43 of Fig. 42.

Referring to the drawings:—50 indicates a derrick of any appropriate type for raising the pump rods and holding them in position during the boring operation and for use in removing the pipes from the well or inserting them therein.

51 is a shaft mounted upon the derrick adapted to be driven by power applied thereto through the chain or belt 52 from any suitable source of power.

53 indicates a shaft journaled in a frame 54 (see Fig. 3) suitably mounted upon said derrick, said shaft being driven from the shaft 51 and adapted to drive through intermediate shafts and gears a rotary device 55 (see Fig. 6). This rotary device 55, or rotary as it is called in this specification, is adapted to have mounted upon it a number of different turntables depending upon the nature of the work to be done. The turntable 56, shown in Figs. 3, 6 and 9, is provided with gripping devices adapted to be tightened upon a comparatively large well tube or boring pipe. When it is desired to bore a well the derrick 50 is set up at the desired point; a cable 57 is led over one of the pulleys 58 at the top of the derrick, one end being suitably attached to the upper end of a large drill 59 (see Figs. 1, 3 and 9), the other end being connected to a drum 60 which is revolubly mounted in the derrick and is driven, as hereinafter described, from the shaft 51. With the connection as described the drum 60 is rotated lifting the drill into vertical position, the drill being then lowered into position extending through the turntable 56. The gripping devices of this turntable are then tightened about the drill and power is applied to the rotary for the rotation of the turntable 56 and the drill 59, the drill being adapted to be held by the gripping devices against rotation relative to the turntable, but being adapted to descend relative to the turntable as the drilling progresses. The hollow drill 59 has fed to it a supply of water which washes away the borings as fast as they are torn loose. When the drill has been sunk substantially its entire length a second section of tube of the same size is connected to the drill by means of screw threaded sleeves, and the boring proceeds to the point where progress is stopped by rock or other strata which this form of drill is not adapted to penetrate. When the drilling by means of the drill 59 ceases the sections of pipe may be removed from the well if desired if the strata through which the well has been sunk up to that point are firm enough to prevent caving. If the ground is not firm it is necessary to keep the well tube in the well during the further progress of the drilling.

When drilling has ceased through the use of the drill 59, the turntable 56 is removed from the rotary and a turntable 61 is mounted on the rotary, as shown in Figs. 13, 17 and 19. This turntable 61 is adapted to grip a smaller pipe 62 which is let down in the well by the cable 57. The boring pipe 62 is provided at its lower end with a drill of any suitable type adapted to bore through rock or other hard substances, the boring pipe being hollow and being adapted to have a stream of water forced down through it for floating upward the borings torn loose from the bottom of the well. As the depth of the well increases and the weight of the boring pipe 62 correspondingly increases the cable 57 will be threaded through a pulley-block 63 in connection with the desired number of the pulleys 58 at the top of the derrick for the proper handling of the increased weight of the boring members.

As the boring progresses the weight of the boring pipes becomes so great as to put an undue pressure upon the drilling unit. It therefore becomes necessary to support a portion of the weight of the boring pipes by means of the cable 57 during the boring operation. To this end I have provided a hand-wheel 64 provided with a worm 65 meshing with a worm-gear 66 adapted to be connected as desired with the drum 60, whereby the tension of the cable 57 can be regulated manually.

It is sometimes desirable to jump the boring pipe and the drill up and down in the well. This might be done to a limited degree by means of the hand-wheel 64 as will be readily understood. I have found it much preferable, however, to provide other means for jumping the boring pipe which will serve this purpose without disturbing the adjustment of the tension of the cable 57. I have accomplished this result by the use of a cam 67 (see Figs. 13, 17 and 18), which can be thrown into operation whenever desired to periodically raise the boring pipe and to let it drop abruptly. I have provided also a cam 68 operating in the same general way except that it raises the boring pipe gradually and lowers it again gradually (see Figs. 19 and 20).

When the boring is progressing each new section of the boring pipe is screwed on to the top of the section last added by hand. It is sometimes necessary, however, to remove the entire string of boring pipe. When it becomes necessary to remove the entire string of pipe from the well or to replace it in the well, I remove from the rotary the cam 67 or 68 and the turntable 61 and mount on the rotary in lieu thereof a table 69 which is held against rotation (see Figs. 21, 22 and 23). The table 69 is equipped with means for holding against rotation the device 70 by which the cable 57 is attached to the boring pipe, said device 70 being known as an elevator. The rotary 55 is then provided with means for gripping the upper sections of pipe, while the lower sections are held against rotation, with the result that the pipes are very speedily unscrewed and withdrawn from the well or screwed together and replaced in the well as the case may be.

It sometimes becomes necessary or desirable to lower a sand pump or other light tool into the well by means of a cable. For this purpose I have provided a drum 71 which may be driven when desired from the shaft 51. The cable 72 is adapted to be wound thereon and to run from the drum to one of the pulleys 58 in the top of the derrick. I make the drum 71 of considerably larger diameter than the drum 60 and rotate it much more rapidly whereby a light tool can be lowered to the bottom of a deep well and be withdrawn therefrom in a comparatively short time.

Whenever it is necessary to raise a comparatively light load a short distance, this can be accomplished by means of a cable running over one of the pulleys 58 at the top of the derrick, said cable being wound about a spool 73 rotating with the shaft 51, the spool serving to exert a pull upon the rope so long as the cable is kept tight upon the spool as will be readily understood.

Coming now to detailed description of the construction and referring particularly to Figs. 3, 4 and 5, 74 indicates a shaft journaled in bearings mounted upon the derrick 50, said shaft having the drum 71 loosely mounted thereon, the drum 60 fixed thereon and the worm-wheel 66 fixed thereon. The drum 71 is provided with a brake-band 75 operating in any approved manner upon a flange carried by one of the heads of the drum, whereby the drum may be held against rotation by a complete tightening of the brake 75 or may be slowed down to the desired rotation upon a partial tightening of the brake, the brake-band being tightened by a downward stroke of the lever 76, as will be readily understood. 77 indicates a spring tending to hold the brake-band 75 out of operative contact with the drum 71. 78 indicates a gear revolubly mounted upon the shaft 74 adjacent to the drum 71, said gear 78 and the head of the drum 71 adjoining the gear being provided with frictional surfaces whereby said parts may be caused to rotate together. 79 indicates a lever pivotally mounted upon the framework of the derrick provided with a yoke 80 at its upper end operating in a groove 81 in the hub 82 extending from one end of the drum 71. 83 indicates a crank pivotally mounted in the framework of the derrick 50 at the left-hand side thereof as seen in Fig. 4, the lower end of the crank being connected by a link 84 with the lever 79, the construction being such that by a turning of the crank rod 83 the lever 79 may be turned on its pivot and the drum 71 moved into or out of frictional engagement with the gear 78. 85 indicates a sprocket-chain connecting the sprocket-gear 78 with a sprocket-gear 86 fixed upon the shaft 51 in line therewith. 87 indicates a brake-band mounted upon a flange carried by one of the heads of the drum 60, said brake 87 being adapted to be tightened upon the drum 60 by a downward stroke of the lever 88 connected therewith, so as to either slow down said drum or as to hold it against rotation. 89 indicates a spring tending to hold said brake-band out of operative contact with the drum 60. 90 indicates one member of a clutch revolubly mounted upon the shaft 74, being driven from the shaft 51 by means of a sprocket-gear 91 fixed on said clutch member, a sprocket-gear 92 fixed on said shaft 51 and a sprocket-chain 93 connecting said two gears. 94 indicates a clutch member feathered upon the shaft 74 adapted to be slid by means of a lever 95 into engagement with the clutch member 90, as will be readily understood, whereby said drum 60 may be driven as desired by the shaft 51.

The worm 65 is shown in Fig. 5 to be fixed upon a shaft 96, upon which the hand-wheel 64 also is fixed, said shaft 96 being slidable longitudinally in the bearings 97 mounted on the framework of the derrick. It will be understood that when the worm 65 is supporting the weight of the boring pipe through the cable 57 the pull upon the worm-gear 66 will be in counter-clockwise direction in Fig. 5. Whenever it is desired to raise or lower the boring pipe slightly this can be accomplished by the manipulation of the hand-wheel 64. When, however, it is desired to raise the boring pipe any considerable distance this result is to be accomplished by throwing the clutch member 94 into engagement with the clutch member 90 when the drum 60 will be rotated in clockwise direction, as shown in Fig. 5, the worm 65 being slid to the right, as shown in dotted lines in Fig. 5.

98—99 indicate sprocket-gears keyed or otherwise fixed upon the shaft 51 adapted to be connected by means of a sprocket-chain 100 to any suitable source of power.

101 indicates a sprocket-gear fixed upon the shaft 51, being connected by means of a sprocket-chain 102 to a sprocket-gear 103 fixed upon the shaft 53, which is mounted in the frame 54 located directly over the well.

Referring now to Figs. 3, 6 and 7, 104 indicates an annular support fixed upon the frame 54. As best shown in Fig. 6, said support is provided near its lower end with an annular chamber having an inclined bottom surface, in which chamber are mounted a plurality of beveled anti-friction rollers 105, upon which the rotary 55 is mounted. 106 indicates gear-teeth (see Fig. 13) on the lower face of an outwardly extending flange of the rotary, meshing with which there are beveled-gears 107—108 (see Fig. 6), which are non-rotatably mounted upon shafts 109—110, respectively, journaled in suitable brackets carried by the frame 54. 111—112 indicate sprocket-gears fixedly mounted upon shafts 109—110, respectively. 113—114 indicate shafts mounted in suitable bearings on the frame 54 parallel with the shafts 109—110, said shafts 113—114 being mounted in alinement with each other. 115—116 indicate sprocket-gears fixedly mounted upon said shafts 113—114, respectively, in alinement with the sprocket-gears 111—112, the gears 111—115 being joined by a sprocket-chain 117 and the gears 112—116 being joined by a sprocket-chain 118. The shafts 113—114 have mounted upon their adjacent ends beveled gears 119—120, respectively, said beveled gears being fixed to said shafts, on opposite sides of the shaft 53, which extends at right angles to the shafts 113—114. 121—122 indicate beveled gears loosely mounted upon the shaft 53 and meshing with the beveled gears 119—120. 123—124 indicate clutch members fixedly secured to the gears 121—122, respectively. 125 indicates a clutch member feathered upon the shaft 53 between the clutch members 123—124. 126 indicates a lever (see Fig. 8) pivotally mounted upon a bracket 127 carried by one of the parts of the frame 54, said lever being forked at its lower end and provided with studs or rollers 128 adapted to work in a circumferential groove in the clutch member 125. As will be readily understood, by the manipulation of the lever 126 the clutch member 125 can be held at an intermediate point whereby both the gears 121 and 122 are permitted to remain at rest, or the clutch 125 may be moved into engagement with the clutch member 124 for driving the shafts 113—114 in opposite directions, or the clutch 125 may be moved into engagement with the clutch member 123 for driving both of said shafts in opposite directions, each shaft being driven in the reverse direction from that when the driving is accomplished through the gear 122.

It will be seen that by the use of my improved driving mechanism the shafts 113—114 are driven in opposite directions and that consequently the gears 107—108 will be driven in opposite directions whereby power will be transmitted evenly to both sides of the rotary 55 whereby the driving of the rotary may be accomplished with a minimum of friction and lost motion. It will be seen that by a stroke of the lever 126 the direction of rotation of the rotary 55 may be changed.

Referring to Figs. 3, 6 and 9, it will be seen that the turntable 56 comprises two frame members 129—130, each slidingly mounted upon two of the posts 131 which are removably mounted in upright position in the rotary 55. The turntable comprises further two cross-heads 132—133 adjustably mounted, as hereinafter described, upon the frame members 129—130. 134 indicates a table having a central opening adapted to be mounted upon the rotary 55 at its inner edge, adapted to support the parts of the turntable in proper position.

Referring now to Fig. 9, 135—136 indicate rods revolubly mounted in the frame members 129—130, respectively, each of said rods 135—136 being screw-threaded, the threads at opposite ends of said rods being cut in the opposite directions. Each of said rods is provided with a squared central portion which works between oppositely disposed flanges 137 of said frame members serving to hold the rod against longitudinal movement and serving also as a means for turning the rod. Each of the cross-heads 132—133 is screw-threaded at its ends to receive the screws 135—136, upon which they are mounted, whereby the cross-heads are adapted to be moved toward or from each other by a proper manipulation of said screws. 138 indicates shafts fixed in the cross-heads 132—133, each of which has revolubly mounted upon it two disks 139 which are spaced apart on said shafts as desired by means of a plurality of washers 140 also mounted upon said shafts. As is shown in Fig. 9, the disks 139 are adapted to be brought into tight engagement with the well tube or boring pipe 59 by the proper turning of the screw-rods 135—136, said disks 139 being adapted to grip the pipe so as to cause it to rotate with the turntable 56, but permitting longitudinal movement of the pipe relative to the turntable.

Referring especially to Figs. 10 and 11, 141 indicates clips mounted in the frame members 129—130 at their ends, adapted to have mounted thereon brackets 142 which are adapted to be turned up on the clips 141, as indicated in dotted lines in Fig. 10, or to be turned down as shown in solid lines in said figure with the slots 143 in their free ends engaging the squared end portions of the screw-rods 135—136. By the use of these devices the screws 135—136 may be kept from working loose during the operation of the machine.

As is best shown in Fig. 9, the frame members 129—130 and the cross-heads 132—133 are in the form of housings which serve to protect the screws 135 and the bearings of the disks 139 from the dirt and water.

Referring now to Figs. 6 and 12, 144 indicates rollers revolubly mounted in any suitable way at the lower end of the annular support 104, said rollers being adapted to support a cylinder 145. 146 indicates a shaft provided with a handle 147 at its outer end and provided with a pinion 148 at its inner end adapted to mesh with the teeth 149 of a rack formed on the lower edge of the cylinder 145. It will be understood that the cylinder 145 can be given a partial revolution on a vertical axis by the rotation of the shaft 146 by means of the handle 147. 150 indicates a sleeve mounted above the sleeve 145 on the inside of the support 104.

As best shown in Fig. 7 the sleeve 150 is provided with ribs or guides 151 adapted to slide in correspondingly-shaped grooves 152 formed in the annular support 104, said cylinder 150 being slidable up and down in the support 104.

As best shown in Figs. 6 and 19, the cylinders 145 and 150 are provided at their meeting edges with oppositely inclined lugs 153—154. By a turning of the handle 147, consequently, rotating the sleeve 145, the sleeve 150 is caused to rise, the inclined lugs 154 riding up the inclined lugs 153 as will be readily understood.

Referring now to Figs. 13 and 17, which show the cam members 67 in position upon the rotary 55, it will be seen that said cam member 67 is provided on its lower edge with a series of teeth 155 corresponding to the teeth 156 on the upper edge of the cylinder 150. The cam member 67 is normally rotatable relative to the support 104 and the cylinder 150, but it will be understood that when the cylinder 150 has been raised by the turning of the handle 147, as above described, the teeth 156 of said cylinder are brought into engagement with the teeth 155 of the cam member, thus holding the cam member against rotation with the rotary relative to the stationary parts.

The turntable 61 shown in Figs. 13 and 17 in position upon the rotary 55 consists of two sections 157 and 158 which are joined together at their inner ends, as hereinafter described, the outer end of each of which is slidably mounted upon one of the posts 131 carried by the rotary. As shown in Fig. 13, the inner ends of the sections 157—158 rest upon a central sleeve or hub portion 159 of the cam member 67, by which the sections are supported in proper alinement relative to each other.

As is best shown in Fig. 15, the sections 157—158 are connected together by means of bolts 160 which pass through laterally extending lugs 161, heavy washers 162 of rubber or other yielding material being mounted upon said bolts so that the sections 157—158 may be permitted a slight swinging or pivotal movement relative to each other. 163—164 indicate gripping devices mounted in suitable recesses in the inner ends of the sections 157—158 and held in position therein by plates 165 suitably secured to said sections. As best shown in Fig. 15 the gripping devices 163—164 are provided with teeth on their outer faces whereby they are adapted to grip the pipe 62 and to cause it to rotate with the turntable as will be readily understood.

166—167 indicate gripping devices pivotally mounted upon the sections 157—158, respectively. As best shown in Fig. 14, each of said gripping devices 166—167 is provided with four concave arc-shaped faces, said faces being at different distances from the pins 168 by which the gripping devices are secured in position. As best shown in Figs. 16 and 13 the operative arc-shaped faces of the gripping devices 166—167 are provided with horizontally extending teeth whereby said devices are adapted to grip the pipe 62 when in proper operative position to hold said pipe against movement longitudinally of itself relative to the turntable. It will be understood that the gripping devices 166—167 can be turned on the pivot pins 168 so as to provide for the use of any of the operative faces of said gripping devices as desired according to the size of the pipe 62. As is seen from Fig. 16 the gripping devices 166—167 are located somewhat above the horizontal plane passing through the bolts 160. 169 indicates rollers revolubly mounted on the turntable 61 in position directly over the rises 170 or cams proper of the cam member 67.

When the cylinder 145 in the position shown in Fig. 6 with the cylinder 150 in its lowermost position, and with the teeth 156 of said cylinder accordingly out of mesh with the teeth 155 of the cam member 67, upon the rotation of the rotary 55 the boring pipe 62 will be rotated, the cam member 67 rotating with the rotary by which it is supported. When, however, it becomes necessary to jump the boring pipe 62, as hereinbefore described, the handle 147 will be given sufficient rotation to turn the cylinder 145 relative to the cylinder 150 to raise the cylinder 150 so that the teeth 156 thereof are brought into mesh with the teeth 155 of the cam member 67. The cam member 67 is then held against rotation whereupon the rollers 169 upon the continued rotation of the rotary ride up the rises 170 of the cam member. While the gripping devices 163—164 will not hold the shaft 62 against longitudinal movement relative to the turntable, they do exert sufficient downward pressure upon the pivotal connection of the sections 157—158 to cause said sections to swing slightly relative to each other causing the gripping devices 166—167, which have been normally out of operative position, to assume an operative engagement with the boring pipe 62 whereby the pipe 62 is carried upward with the turntable 61. When the roller 169 reaches the end of the rise 170 of the cam member, the continued rotation of the turntable carries the roller off the end of the cam proper 170 permitting the turntable and the pipe 62 to drop abruptly. As hereinbefore described when the jump takes place when the roller 169 passes off the end of the rise 170, the entire weight of the boring pipe may be permitted to fall upon the drill at the bottom of the well. On the other hand by means of the cable 57 the pipe 62 may be partially supported so as to limit the blow upon the drill. When the turntable and shaft are permitted to drop, as above described, the inner ends of the sections 157—158 are brought into contact with the hub or sleeve 159 of the cam member thus forcing the sections 157—158 again into alinement with each other, moving the gripping devices 166—167 out of operative engagement with the pipe 62, thus permitting the pipe 62 to fall without restraint except as it may be supported more or less by the cable 57.

Referring now to Figs. 19 and 20, in which the cam member 68 is substituted for the cam member 67, 171 indicates the teeth on the cam member 68 corresponding to the teeth 155 of the cam member 67, and 172 indicates the rises of said cam member 68 corresponding to the rises 170 of the cam member 67. It will be understood that in the use of the apparatus shown in Fig. 19 the operation is exactly the same as that described in connection with Figs. 13 and 17 except that the turntable and pipe 62 are gradually raised and again gradually lowered by the cam member 68 instead of being gradually raised and permitted to drop. Fig. 19 also illustrates another expedient which may be practised either in connection with the cam member 68 or with the cam member 67. In this figure a plurality of washers 173 are shown mounted upon the posts 131 interposed between the turntable 61 and the rotary 55. A like number of rings 174 may be mounted upon the hub or sleeve 159 for supporting the inner ends of the sections 157—158 on an even basis with the outer ends of said turntable, said rings in the construction shown being provided with ribs at their inner edges for holding the rings in position. The object of the use of these blocks is to enable the use of the cam member 68 or the cam member 67 to raise and lower the pipe 62 to a limited extent rather than to the full extent permissible by the height of the rises of the cam members. When such a blocking up expedient is practised in connection with the cam member 67, it is especially desirable that the rings or blocks 174 shall be formed of wood or other yielding material to take away a great proportion of the shock due to the drop of the turntable and pipe onto the rotary and the cam member.

Referring now to Figs. 21, 22 and 23, which illustrate the table 69 and the parts used in connection therewith, 175 indicates lugs depending from the table 69 in line with the stationary support 104 adapted to engage notches 176 in the upper end of said support 104 (see Fig. 6), whereby said table 69 is held against rotation. 177 indicates a central sleeve or hub through which the boring pipe 62 extends and upon which the elevator 70 is adapted to rest, the upper end of the sleeve 177 and the lower end of the elevator 70 being notched as shown in Figs. 24 and 26 whereby the elevator may be held against rotation relative to the table 69 and consequently held stationary. 178 indicates cross-bars provided with socketed heads at their ends adapted to be mounted slidably upon the posts 131, the heads of said cross-bars being provided with set-screws 179 by which the heads are adapted to be secured in position upon the posts 131. The function of the cross-bars 178 is to support the handles or levers of the wrench 180 hereinafter described, and to support the parts of the wrench when they are disconnected from each other and from the pipe. The cross bars also serve as braces from one post to the other.

Referring now to Figs. 24 to 30, it is seen that the elevator 70 comprises two sections 181—182 suitably hinged together at one side and removably secured together by means of a clip 183 at its other side. 184—185 indicate T-buttons formed with or suitably attached to the sections 181—182, respectively, of the elevator 70, over which buttons links 186 are adapted to be removably placed for the raising or the lowering of the boring pipe 62, said links being mounted on the end of the cable 57 or on the pulley block supported by the cable. 187 indicates the interiorly threaded sleeves by which the sections of the boring pipe 62 are united.

Referring now particularly to Figs. 28 to 30, which illustrate the mechanism by which the pipe 62 is supported through the medium of the elevator 70, it will be seen that the elevator 70 is provided with gripping devices 188 which are mounted in suitable slots formed in the inner periphery of the elevator. 189 indicates springs adapted to yieldingly hold said gripping devices 188 in the position shown in Fig. 28 with the upper ends thereof extending above the edge of the sections 181—182. When however the elevator 70 has been locked together about a section of pipe 62 provided with a coupling sleeve 187 at its upper end, and the coupling sleeve has been lowered into contact with the gripping devices 188, said gripping devices are forced downward and inward, the lower edge of each of said blocks being forced into contact with the pipe 62 and the sleeve 187 remaining in contact with said gripping devices near their upper ends. The weight of one of the sections 62 is sufficient to force the gripping devices 188 firmly into contact with the pipe and with the coupling sleeve. As shown in several figures the inner faces of the gripping devices 188 are provided with vertically extending teeth which are adapted to cut into the pipe and into the coupling whereby the pipe and coupling are held against rotation.

Coming now to the wrench 180, which is carried around by the rotary 55 for the purpose of securing an upper section of pipe upon or unscrewing such a section from the pipe supported by the elevator 70 on the table 69, 190—191 indicate the levers of said wrench, the outer ends of which are inserted between two cross-bars 178 and are adapted to be turned by the rotary 55 by contact with oppositely disposed posts 131 as will be readily understood. Each of the levers 190—191 is forked at its inner end, between the forked ends of which are pivotally mounted gripping chains 192—193, respectively, by means of pins 194. Each of said chains comprises a plurality of blocks 195 having curved gripping faces joined at their ends by short links 196 at both sides thereof, said links being connected to said blocks by means of pins 197.

As best shown in Fig. 33 the inner face of each forked end of each lever 190—191 is provided with a block 198 located between the pin 194 and the outer end of the lever and provided with grooves 199 in their outer faces into which the pins 197, by which one of the links 196 is attached to adjacent blocks 195, are adapted to fit.

As will be readily understood, in use the levers 190—191 are placed on opposite sides of a pipe to which the wrench is to be applied and the chains 192—193 are wrapped about the pipe. The chain 192 carried by the lever 190 is secured to the lever 191 by inserting two of the pins 197 carried by one of the links 196 in the grooves 199 in the blocks 198 of the lever 191, in which position they are held by the insertion of a key 200 in slots 201 in such a position as to prevent the withdrawal of the pins 197 from said slots 199. The other chain 193 carried by the lever 191 is similarly wrapped half way about the pipe to be gripped and secured to the lever 190 by means of a key 200. It will be understood that by the rotation of the rotary 55 in counter-clockwise direction, as shown in Fig. 21, two of the posts 131 would be brought into contact with the levers 190—191, tending to move both of said levers upon their pivot pins 194 in counterclockwise direction, as shown in said figure, whereby the chains 192—193 would be tightened upon the pipe 62 and said pipe would be rotated in counterclockwise direction. It will be understood that if it were desired to rotate the pipe 62 in the opposite direction or in clockwise direction, as shown in Fig. 21, it would be necessary to apply the wrench 180 to the pipe in an inverted position as compared to that illustrated in Fig. 21, whereupon the contact of the posts 131 would tend to turn each of the levers 190—191 upon its pivot pin 194 in clockwise direction, tightening the chains upon the boring pipe and causing a rotation of said pipe in clockwise direction.

It is believed that by the use of my improved wrench the objectionable slipping of one of the chains without a corresponding slipping of the other chain relative to the boring pipe will be prevented. It is apparent that if one of the chains slips the other chain also will be free to slip. Thus so long as the wrench grips the pipe at all the power is applied at both sides of the pipe and there will be no tendency to bend the pipe out of its central vertical position, the pressure in one direction applied by one of the levers being balanced by a like pressure in the other direction applied by the other lever.

Referring now to Fig. 1, 202 indicates two pieces of water hose connected to any suitable source of water under pressure, the connection being at a point well up in the derrick 50. When drilling is progressing by means of a section of pipe 62, to which a stream of water is fed by one of the sections of hose 202, another section or string of sections of pipe 62 is prepared and laid in position for use when the boring has progressed to a point where additional pipe is needed. The section of hose 202 which is not being used for boring is attached to the section next to be used, so that when the new section of pipe is added all that is necessary to switch the water supply from the old section to the new is to close the valve at the end of the one section of hose and to open the valve at the end of the other section. 203 indicates a sand pump of any suitable type mounted upon a cable 204 for use as hereinbefore explained.

Referring now to Figs. 34 and 36, 205 indicates a valve adapted to be opened downward by the stream of water forced down through the pipe 62, said valve being mounted at the lower end of said pipe. It will be understood that the water which is in the well outside of the boring pipe 62 is heavier than the water in the boring pipe by reason of the particles of dirt and rock floating in the water in the well. The valve 205 prevents the passage of the dirty water in the well up through the pipe 62 at the time when the supply of water is shut off for the purpose of adding an additional section of pipe or for any other reason. This is necessary for the reason that otherwise the dirty water from the well would rise in the well tube when the pressure was shut off forcing the water from the well tube and onto the workmen who were engaged in attaching a new section of pipe. As shown in Figs. 34 and 36 this valve comprises a plate 206 adapted to be secured adjacent to the pipe 62, a closure plate 207 and a spring 208, by which said closure plate is yieldingly held in contact with the plate 206.

Referring to Figs. 34 and 35, 209 indicates a coupling sleeve screw-threaded on the lower end of the boring pipe 62, serving to hold the valve 206 in position relative to the boring pipe. 210 indicates a bar screw-threaded in the lower end of the coupling sleeve 209, having a recess in its upper end to accommodate the said valve and provided with a duct 211 extending longitudinally through the bar. The lower end of the bar 210 extends at a slight angle relative to its upper end, whereby the drill 212 mounted on the lower end of said bar is held at a slight angle from the horizontal. 213 indicates a circumferential flange formed with the bar 210 provided on its lower face with a groove for a series of anti-friction balls. 214—215 indicate collars shrunk upon the upper end of the drill 212, the collar 214 being provided with a groove opposite to the groove in the flange 213. The reason for the use of collars 214—215 is that the drill 212 is preferably to be cast of manganese steel which is so hard and tough that it is very difficult to machine it. The sleeve or collar 215, however, may be readily provided with screw-threads by means of which the drill as a whole is secured upon the bar 210 through the medium of a flanged sleeve 216, the lower end of which is screw-threaded upon the sleeve 215, anti-friction balls 217 being interposed between the flange 213 and the collar 214. The drill 212 has cast in it a central opening 220 communicating with the duct 211 in the bar 210, and is provided also with a plurality of tapered openings 221.

As has been set forth above, the drill 212 is designed especially for boring in hard strata such as would very quickly dull a drill rotated in the ordinary manner. Ordinarily it is not necessary to use a drill of this type until the boring has progressed some little distance so that by the time it is desirable to use the drill 212 there will be a comparatively heavy line of boring pipe supported by the drill as it is driven. Inasmuch as the boring pipe is revolubly mounted in the drill 212 the drill is not rotated with the bar, but is gyrated or continuously and progressively tipped.

As shown in Fig. 34, the lower face of the drill is provided with teeth so that the tool is adapted to dig into the earth or rock and break loose particles therefrom which are crushed by the further operation of the tool or are floated upward by the water delivered through the pipe 20. As the particles are broken loose and are crushed by the movement of the drill the broken particles assist the boring tool in digging into the stratum being penetrated. The particles of rock and gritty substance are forced into the earth and then torn loose again, assisting in this way in the boring. This result is accomplished without any material wear upon the drill itself. It is sometimes found to be a good policy to drop into the well a quantity of very hard irregular shaped particles, such as "adamantine," that can be forced into the strata and torn loose again for assisting in the boring. I have found that when such a substance as adamantine is used the particles of such substance are forced into the solid rock or are carried around the hole acting as auxiliary cutting elements. This form of drill is also particularly adapted to a jumping action inasmuch as there are no parts of the drill particularly likely to be broken through the striking of a crushing blow. This form of drill is also extremely unlikely to catch in the bottom of the well. When a drill catches in the bottom of a deep well the continued rotation of the upper end of the pipe causes the pipe to shorten considerably in length causing the pipe to feed at an abnormal rate through the rotating grippers. When, thereafter, the drill is broken loose from the bottom the pipe again stretches out to its normal length very suddenly due to the elasticity of the steel pipes, lifting the gripping devices and the turntable at the top of the well and sometimes bringing them down again upon the rotary with a destructive blow. Very often in a case of this sort the mechanism is broken and a serious delay is encountered. Any improvement in drilling apparatus which can overcome this tendency is accordingly of very great importance. Inasmuch as the drill is tipped slightly, the weight of the boring pipe is supported by that part of the drill which is tipped the farthest down. This part of the drill is removed slightly from the outside edge of the well, by reason of which the drill is caused to creep slowly about the well in the same direction in which the boring pipe is rotated, in addition to its gyratory or tipping movement. This insures that at every point about the periphery of the well a different part of the drill shall be effective at each revolution of the boring pipe, so that the well is kept circular and straight under normal conditions regardless of any undue wearing of any one portion of the drill.

It will be understood that as the boring pipe rotates its lower end will be caused to have a gyratory motion in the well. In order to utilize this motion of the boring pipe to ream out slightly and to reduce any irregularities in the face of the well I provide a reamer 222 which is rotatably mounted upon the coupling sleeve 209. The reamer 222 is provided with teeth about its entire periphery and is of such a diameter as to contact the wall as the boring pipe is revolved.

As the drill 212 is tipped progressively in the bottom of the well with the weight of the boring pipe thereon, as above described, the progressively-changing lowermost edge of the drill will groove out the bottom of the hole in advance of the center and edges of the well, leaving an upwardly-extending central point. As the gyration of the drill continues the central portion of the drill will wear away the central point, while one side edge of the drill will be scraping upward on the side of the hole and at the same time the opposite side edge of the drill will be scraping downward. At the same time the lowermost part of the drill will be digging into the earth or rock and crushing the particles that have theretofore been torn loose. If the drill is set at a comparatively great angle from the horizontal the action of the lowermost part of the drill as it shifts progressively about the hole is in the nature of a blow and is very effective especially in some formations.

As the rotation of the boring pipe 62 continues a stream of water is forced downward through the pipe, as above described, the water having a tendency to escape through the joint between the drill 212 and the lower end of the bar 210 as well as through the opening 220, which is of a reduced size, thus washing out and lubricating the bearings. By the provision of the openings 221 through the drill the water is permitted to churn upward through the openings thus assisting in the assimilation of the borings whereby they may be floated upward and out of the well.

Referring to Figs. 37 and 38, which illustrate a slightly modified form of device, the parts are indicated by the same reference characters but with the addition of an exponent a. In this modified form the drill 223 is set at a considerably greater angle than that shown in Fig. 34 and the bottom face of the drill is substantially straight instead of being hollowed out as in said Fig. 34.

In Figs. 39 and 40 there is illustrated another form of drill. In this form of device a bar 224 is secured to the lower end of the boring pipe 62 by means of a coupling sleeve 225. The drill 226 has the lower end of the bar 224 inserted in a suitable socket therein, in the end of which socket there is provided a hardened plate 227 which is provided with suitable grooves for anti-friction balls 228 which engage also a suitable groove in the lower end of the bar 224. The upper end of the drill is provided with openings therethrough for the insertion of pins 229 which work in a groove 230 in the bar 224 for holding the drill against withdrawal from the bar. The bar 224, the plate 227 and the drill 226 are provided with a central duct 231 for the passage of the supply of water from the hollow boring pipe 62. The drill 226 is also provided with openings 232 therethrough corresponding to the openings 221 of the form shown in Fig. 34. A reamer 233 is fixed upon the coupling 225.

Figs. 41, 42 and 43 show still another form of drill. In this form of device the action of the drill is precisely the same as that of the other forms shown, the lower end of the boring pipe, however, being held in a central position instead of being caused to travel about the hole. In this device 234 indicates a bracket having a screw-threaded lug 235 rising therefrom by which said bracket is connected to the lower end of the boring pipe by means of a screw-threaded coupling sleeve 236. 237 indicates a bracket secured in position in contact with the bracket 234 by means of screws 238, said screws also revolubly supporting reamers 239. The bracket 237 terminates at its lower end in a circular stud 240 extending at an angle of substantially forty-five degrees from the perpendicular. Upon the stud 240 is revolubly mounted a drill 241 of substantially the type shown in Fig. 37. The drill 241 is kept in position on the stud 240 by means of pins 242 extending through the drill and working in a groove 243 extending circumferentially about said stud. The lug 235 is provided with a centrally located longitudinally extending duct 244 communicating with the hollow boring pipe 62 and connecting at its lower end with a similar duct 245 in the bracket 237. The drill 241 is provided with a central duct 246 communicating with the lower end of the duct 245 in the bracket 237. The drill 241 is also provided with openings 247 extending therethrough.
As will be readily understood the action of the reaming devices 239 is substantially the same as that of the reamers heretofore described except that the action is more continuous. In the construction here shown also the reamers serve to keep the lower end of the boring pipe and the drill centered in the well. This is of especial importance when the drill is passing from a hard stratum into a soft one or from a soft stratum into a hard one. In cases where the drill has been passing for a considerable distance through a stratum of comparatively yielding material and arrives at a stratum of rock or other hard material, the reamers serve to hold the boring pipe centrally of the hole while the drill is penetrating the first few inches of the rock sufficiently to be guided thereby.

No claim is made herein to my improved gyratory drill, inasmuch as these improvements are covered by the claims of my application, Serial No. 839,381, filed May 18, 1914.

What I claim as my invention and desire to secure by Letters Patent is:—

1. In a well sinking apparatus, in combination, a boring pipe, a drill mounted on its lower end, means for rotating said pipe, means for supporting said pipe to regulate the pressure upon the drill, and independently-acting means for jumping said pipe.

2. In a well sinking apparatus, in combination, a boring pipe, a drill mounted on its lower end, means for rotating said pipe, means for supporting said pipe to regulate the pressure upon the drill, and independently-acting means for automatically jumping said pipe.

3. In a well sinking apparatus, in combination, a boring pipe, a drill mounted on its lower end, means for rotating said pipe, means for supporting said pipe to regulate the pressure upon the drill, and independently-acting means for automatically jumping said pipe at regular intervals.

4. In a well sinking apparatus, in combination, a boring pipe, a drill mounted on its lower end, means for rotating said pipe, means for supporting said pipe to regulate the pressure upon the drill, and independently-acting means for jumping said pipe during the continued rotation of said pipe.

5. In a well sinking apparatus, in combination, a boring pipe, a drill mounted on its lower end, means for rotating said pipe, means for supporting said pipe to regulate the pressure upon the drill, and independently-acting means for gradually raising said pipe and thereafter gradually lowering it.

6. In a well sinking apparatus, in combination, a boring pipe, a drill mounted on the lower end thereof, means for rotating said pipe, and means for automatically jumping said pipe at intervals during the rotation of the pipe.

7. In a well sinking apparatus, in combination, a boring pipe, a drill mounted on the lower end thereof, means for rotating said pipe, and means for automatically raising and gradually lowering said pipe at intervals during the rotation of the pipe.

8. In a well sinking apparatus, in combination, a boring pipe, a drill mounted on the lower end thereof, means for rotating said pipe, and a cam adapted to raise said pipe at intervals during the rotation of the pipe.

9. In a well sinking apparatus, in combination, a boring pipe, a drill mounted on the lower end thereof, means for rotating said pipe, and a cam adapted to raise said pipe at intervals during the rotation of the pipe and to permit the same to fall abruptly.

10. In a well sinking apparatus, the combination of a boring pipe, a drill mounted on the lower end thereof, means for rotating said pipe, and a cam adapted to engage said pipe rotating means and to raise the same carrying the pipe upward therewith.

11. In a well sinking apparatus, the combination of a boring pipe, a drill mounted on the lower end thereof, means for rotating said pipe, a cam member adapted to rotate therewith, and means adapted to be thrown into operation for holding said cam member against rotation whereby the cam is adapted to engage said pipe rotating means and to raise the same carrying the pipe upward therewith.

12. In a well sinking apparatus, the combination of a boring pipe, a drill mounted on the lower end thereof, means for rotating said pipe, a cam member adapted to rotate therewith, and means adapted to be thrown into operation for holding said cam member against rotation whereby said pipe rotating means is adapted to ride up the rise of the cam at intervals for jumping the pipe.

13. In a well sinking apparatus, the combination of a boring pipe, a drill mounted on the lower end thereof, a turntable, means for rotating said turntable, gripping means carried by said turntable adapted to grip said pipe to cause rotation thereof, means for raising said turntable as it rotates, and other gripping means adapted to cause said pipe to rise with the turntable.

14. In a well sinking apparatus, the combination of a boring pipe, a drill mounted on the lower end thereof, a turntable, means for rotating said turntable, gripping means carried by said turntable adapted to grip said pipe to cause rotation thereof, means for raising said turntable as it rotates, and other gripping means adapted to cause said pipe to rise with the turntable, said last-named gripping means being freed from operative engagement with the pipe upon the subsequent lowering of the turntable.

15. In a well sinking apparatus, the combination of a boring pipe, a drill mounted on the lower end thereof, a turntable, means for rotating said turntable, gripping means carried by said turntable adapted to grip said pipe to cause rotation thereof, means for raising said turntable as it rotates, other gripping means adapted to cause said pipe to rise with the turntable, and means for releasing said last-named gripping means from said pipe when the turntable is lowered to permit said pipe to slip relative thereto.

16. In a well sinking apparatus, the combination of a boring pipe, a drill mounted on the lower end thereof, a turntable, means for rotating said turntable, gripping means carried by said turntable adapted to grip said pipe to cause rotation thereof, means for raising said turntable as it rotates, and other gripping means adapted to cause said pipe to rise with the turntable, said turntable being adjustable up and down relative to the means for raising it whereby the extent to which the pipe is raised by said raising means may be varied.

17. In a well sinking apparatus, the combination of a boring pipe, a drill mounted on the lower end thereof, a turntable, means for rotating said turntable, gripping means carried by said turntable adapted to grip said pipe to cause rotation thereof, a cam up which said turntable is adapted to ride, and gripping means adapted to cause said pipe to rise with the turntable.

18. In a well sinking apparatus, the combination of a boring pipe, a drill mounted on the lower end thereof, a turntable, means for rotating said turntable, gripping means carried by said turntable adapted to grip said pipe to cause rotation thereof, a cam member adapted to rotate with said turntable, means adapted to be thrown into operation for holding said cam member against rotation whereby said turntable is adapted to ride up the rise of the cam, and gripping means adapted to cause said pipe to rise with the turntable.

19. In a well sinking apparatus, the combination of a boring pipe, a drill mounted on the lower end thereof, a turntable, means for rotating said turntable, gripping means carried by said turntable adapted to grip said pipe to cause rotation thereof, a cam member adapted to rotate with said turntable, said cam member being provided with a plurality of rises and abrupt drops, means adapted to be thrown into operation for holding said cam member against rotation whereby said turntable is adapted to ride up a rise of the cam, gripping means adapted to cause said pipe to rise with the turntable, and means for releasing said last-named gripping means for operative engagement with said pipe when said turntable passes off of the rise of said cam.

20. In a well sinking apparatus, the combination of a boring pipe, a drill mounted on the lower end thereof, a turntable, means for rotating said turntable, said turntable comprising two sections connected together and adapted to have a slight swinging movement relative to each other, and gripping devices mounted on said sections adapted to be brought into operative engagement with said pipe for raising the pipe upon the application of an upward pressure to said sections.

21. In a well sinking apparatus, the combination of a boring pipe, a drill mounted on the lower end thereof, a turntable, means for rotating said turntable, said turntable comprising two sections connected together and adapted to have a slight swinging movement relative to each other, and gripping devices mounted on said sections removed from the horizontal plane passing through the pivotal connection of said sections.

22. In a well sinking apparatus, the combination of a boring pipe, a drill mounted on the lower end thereof, a turntable, means for rotating said turntable, said turntable comprising two sections connected together and adapted to have a slight swinging movement relative to each other, and gripping devices mounted on said sections above the horizontal plane passing through the pivotal connection of said sections.

23. In a well sinking apparatus, the combination of a boring pipe, a drill mounted on the lower end thereof, a turntable, means for rotating said turntable, said turntable comprising two sections connected together and adapted to have a slight swinging movement relative to each other, and gripping devices provided with horizontally extending teeth mounted on said sections removed from the horizontal plane passing through the pivotal connection of said sections.

24. In a well sinking apparatus, the combination of a boring pipe, a drill mounted on the lower end thereof, a turntable, means for rotating said turntable, said turntable comprising two sections connected together and adapted to have a slight swinging movement relative to each other, and gripping devices mounted on said sections adapted to hold said pipe against rotation but to permit endwise movement of the pipe, and other gripping devices mounted on said sections adapted to be brought into engagement with said pipe for raising the pipe upon the application of an upward pressure to said sections.

25. In a well sinking apparatus, the combination of a boring pipe, a drill mounted on the lower end thereof, a turntable, means for rotating said turntable, said turntable comprising two sections connected together and adapted to have a slight swinging movement relative to each other, and oppositely disposed gripping devices mounted on said sections, and means for applying power to said turntable for raising it whereby said gripping devices are brought into operative engagement with said pipe for lifting it.

26. In a well sinking apparatus, the combination of a boring pipe, a drill mounted on the lower end thereof, a turntable, means for rotating said turntable, said turntable comprising two sections connected together and adapted to have a slight swinging movement relative to each other, gripping devices mounted on said sections adapted to hold said pipe against rotation but to permit endwise movement of the pipe, and other gripping devices oppositely disposed relative to each other on said sections, and means for applying power to said turntable for raising it whereby said last-named gripping devices are brought into operative engagement with said pipe for lifting it.

27. In a well sinking apparatus, the combination of a boring pipe, a drill mounted on the lower end thereof, a turntable, means for rotating said turntable, said turntable comprising two sections connected together and adapted to have a slight swinging movement relative to each other, gripping devices mounted on said sections adapted to hold said pipe against rotation but to permit endwise movement of the pipe, and other gripping devices oppositely disposed relative to each other on said sections, means for applying power to said turntable at points removed from the pivotal connection of the two sections for raising the turntable whereby said last-named gripping devices are brought into operative engagement with said pipe for lifting it, and means for stopping the downward movement of said turntable acting thereon at substantially the pivotal connection of the two sections whereby said last-named gripping devices are freed from operative engagement with the pipe and the pipe is permitted to drop relative to the turntable.

28. In a well sinking apparatus, the combination of a boring pipe, a drill mounted on the lower end thereof, a turntable, means for rotating said turntable, a circular cam member adapted to rotate concentrically with said turntable, anti-friction rollers mounted on said turntable adapted to engage the rises of said cam member, means adapted to be thrown into operation for holding said cam member against rotation whereby said turntable is caused to ride up the rises of said cam member, and means carried by said turntable for gripping said pipe for raising it when said turntable is raised by said cam.

29. In a well sinking apparatus, the combination of a boring pipe, a drill mounted on the lower end thereof, a turntable, means for rotating said turntable, a circular cam member revolubly mounted concentrically with said turntable, anti-friction rollers mounted on said turntable adapted to engage the rises of said cam member and to cause said cam member to rotate therewith, means for stopping the rotation of said cam member whereby the turntable rides up the cams, and means carried by said turntable for gripping said pipe for raising it when said turntable is raised by said cam.

30. In a well sinking apparatus, the combination of a boring pipe, a drill mounted on the lower end thereof, a turntable, means for rotating said turntable, a circular cam member revolubly mounted concentrically with said turntable, anti-friction rollers mounted on said turntable adapted to engage the rises of said cam member and to cause said cam member to rotate therewith, means for stopping the rotation of said cam member whereby the turntable rides up the cams, means carried by said turntable for gripping said pipe for raising it when said turntable is raised by said cam, and means for supporting said turntable at varying heights relative to the cam whereby the extent of the raising of the pipe by the cam may be varied.

31. In a well sinking apparatus, the combination of a boring pipe, a drill mounted on the lower end thereof, a rotary, posts rising from said rotary, a turntable comprising two sections connected together and adapted to have a limited swing relative to each other, each of said sections being mounted on one of said posts and adapted to rise and fall thereon, means for applying power for raising said turntable at points removed from the pivotal connection of said sections, and gripping devices carried by said turntable adapted to grip said pipe to raise it with the turntable.

32. In a well sinking apparatus, the combination of a boring pipe, a drill mounted on the lower end thereof, a rotary, posts rising from said rotary, a turntable comprising two sections connected together and adapted to have a limited swing relative to each other, each of said sections being mounted on one of said posts and adapted to rise and fall thereon, means for applying power for raising said turntable at points removed from the pivotal connection of said sections, and gripping devices carried by said turntable above the horizontal plane passing through the pivotal connection of said sections adapted to be brought into operative engagement with said pipe to raise it with the turntable.

33. In a well sinking apparatus, the combination of a boring pipe, a drill mounted on the lower end thereof, a rotary, posts rising from said rotary, a turntable comprising two sections connected together and adapted to have a limited swing relative to each other, each of said sections being mounted on one of said posts and adapted to rise and fall thereon, a circular cam member revolubly mounted on said rotary, said cam member comprising a hub-like portion loosely surrounding the boring pipe adapted to support the turntable at the pivotal connection of the sections thereof, means adapted to be thrown into operation for holding said cam member against rotation whereby said turntable is caused to ride up the rise of said cam member, and means carried by said turntable for gripping said pipe for raising it when said turntable is raised by said cam.

34. In a well sinking apparatus, the combination of a boring pipe, a drill mounted on the lower end thereof, a rotary, posts rising from said rotary, a turntable comprising two sections connected together and adapted to have a limited swing relative to each other, each of said sections being mounted on one of said posts and adapted to rise and fall thereon, a circular cam member revolubly mounted on said rotary, said cam member comprising a hub-like portion loosely surrounding the boring pipe adapted to support the turntable at the pivotal connection of the sections thereof, means adapted to be thrown into operation for holding said cam member against rotation whereby said turntable is caused to ride up the rise of said cam member, and means carried by said turntable for gripping said pipe for raising it when said turntable is raised by said cam, said turntable being adapted to be blocked up above said rotary whereby the extent to which said cam member serves to raise the pipe may be varied.

35. In a well sinking apparatus, the combination of a boring pipe, a drill mounted on the lower end thereof, a turntable, means for rotating said turntable, and means carried by said turntable for causing said pipe to rotate therewith, said turntable comprising two sections on opposite sides of said pipe, and resilient means for connecting said two sections whereby one section is permitted a limited swing relative to the other.

36. In a well sinking apparatus, the combination of a boring pipe, a drill mounted on the lower end thereof, a turntable, means for rotating said turntable, and means carried by said turntable for causing said pipe to rotate therewith, said turntable comprising two sections on opposite sides of said pipe, bolts passing through oppositely disposed openings in said sections for connecting the sections together, and resilient devices mounted on said bolts whereby one section is permitted a limited swing relative to the other.

37. In a well sinking apparatus, the combination of a boring pipe, a drill mounted on the lower end thereof, a turntable, means for rotating said turntable, and means carried by said turntable for causing said pipe to rotate therewith, said turntable comprising two sections on opposite sides of said pipe, bolts passing through oppositely disposed openings in said sections for connecting the sections together, and heavy rubber washers mounted on said bolts whereby one of said sections is permitted a limited swing relative to the other.

38. In a well sinking apparatus, the combination of a boring pipe, a drill mounted on the lower end thereof, a turntable adapted to grip said pipe for rotating it, a circular cam member revolubly mounted relative to said turntable, a cylinder slidably mounted relative to said cam member, means for moving said cylinder into engagement with said cam member for holding the cam member against rotation whereby said turntable is caused to ride up the rise of said cam member, and gripping devices carried by said turntable adapted to be brought into operative engagement with said pipe for raising it when said turntable rides up said cam.

39. In a well sinking apparatus, the combination of a boring pipe, a drill mounted on the lower end thereof, a turntable adapted to grip said pipe for rotating it, a circular cam member revolubly mounted relative to said turntable, a cylinder slidably mounted relative to said cam member, a second cylinder engaging said first cylinder and having inclined bearings thereon, means for giving said second cylinder a slight rotation for raising said first cylinder relative thereto whereby said first cylinder is brought into engagement with said cam member for holding it against rotation with the result that the turntable rides up the rise of said cam member, and gripping devices carried by said turntable adapted to be brought into engagement with said pipe for raising it when said turntable rides up said cam.

40. In a well sinking apparatus, in combination, a boring pipe, a drill mounted on the lower end thereof, means for rotating said pipe, means for supporting said pipe to regulate the pressure upon the drill, and a cam adapted to be thrown into operation when desired to raise said pipe at intervals.

41. In a well sinking apparatus, in combination, a boring pipe, a drill mounted on the lower end thereof, means for rotating said pipe, means for supporting said pipe to regulate the pressure upon the drill, and a cam adapted to be thrown into operation when desired to raise said pipe at intervals and permit it to drop abruptly.

42. In a well sinking apparatus, in combination, a boring pipe, a drill mounted on the lower end thereof, a turntable adapted to grip said pipe for rotating it, means independent of the turntable for supporting said pipe to regulate the pressure upon the drill, and independently acting means for raising said turntable and with it said pipe at intervals.

43. In a well sinking apparatus, in combination, a boring pipe, a drill mounted on the lower end thereof, a turntable adapted to grip said pipe for rotating it but permitting endwise movement of the pipe relative to said turntable, means independent of the turntable for supporting said pipe to regulate the pressure upon the drill, independently acting means for raising said turntable at intervals, and means carried by said turntable adapted to grip said pipe when said turntable is raised to raise said boring pipe with it.

44. In a well sinking apparatus, in combination, a boring pipe, a drill mounted on the lower end thereof, a turntable adapted to grip said pipe for rotating it but permitting endwise movement of the pipe relative to said turntable, means independent of the turntable for supporting said pipe to regulate the pressure upon the drill, a cam adapted to be thrown into operation when desired to raise said turntable at intervals, and means carried by said turntable adapted to grip said pipe when said turntable is raised to raise the pipe therewith.

45. In a well sinking apparatus, the combination of a frame, two gears spaced apart, a rotary revolubly mounted on said frame having teeth with which said two gears mesh, and means for rotating said gears in opposite directions.

46. In a well sinking apparatus, the combination of a frame, two shafts in line with each other, a rotary revolubly mounted on said frame, gears on said shafts meshing with teeth on said rotary, and means for rotating said shafts in opposite directions.

47. In a well sinking apparatus, the combination of a frame, two shafts in line with each other, a rotary revolubly mounted on anti-friction devices on said frame between said shafts, beveled gears on said shafts meshing with a beveled gear-ring on said rotary, and means for rotating said shafts in opposite directions.

48. In a well sinking apparatus, the combination of a frame, two oppositely located gears, a rotary revolubly mounted on said frame between said two gears, said rotary having teeth with which said gears mesh, a shaft mounted in said frame, two gears revolubly mounted on said shaft, connections between said last-named gears and said first-named gears whereby said rotary is rotated upon the rotation of either of said last-named gears, and means for connecting said last-named gears alternatively with said shaft.

49. In a will sinking apparatus, the combination of a frame, two oppositely located gears, a rotary revolubly mounted on said frame between said two gears, said rotary having teeth with which said gears mesh, a shaft mounted in said frame, two gears revolubly mounted on said shaft, connections between said last-named gears and said first-named gears whereby said rotary is rotated upon the rotation of either of said last-named gears, and a clutch feathered on said shaft between said last-named two gears adapted to engage either one of said gears.

50. In a well sinking apparatus, the combination of a frame, two gears spaced apart, a rotary revolubly mounted on said frame having teeth with which said two gears mesh, a shaft, two beveled gears revolubly mounted on said shaft, two other beveled gears meshing with said second-named two gears on opposite sides thereof, means for connecting said last-named gears with said first-named gears respectively, and a clutch feathered on said shaft between said second-named two gears adapted to lock either one of said second-named two gears to said shaft whereby said third-named gears may be driven alternately in either direction.

51. In a well sinking apparatus, the combination of a frame, two beveled gears spaced apart, a rotary revolubly mounted on said frame having teeth with which said two gears mesh, means for rotating said gears in opposite directions, and vertical posts mounted on said rotary adapted to have a turntable slidably mounted thereon.

52. In a well sinking apparatus, the combination of a frame, two beveled gears spaced apart, a rotary revolubly mounted on said frame having teeth with which said two gears mesh, means for rotating said gears in opposite directions, and a turntable mounted on said rotary and rotated thereby, said turntable being adapted to rise relative to the rotary during the rotation thereof.

53. In a well sinking apparatus, the combination of a boring pipe, and a turntable for rotating said pipe, said turntable comprising cross-heads, gripping devices mounted on said cross-heads, screws for moving said cross-heads toward and from said pipe, and housings for said screws adapted to protect them from the dirt.

54. In a well sinking apparatus, the combination of a boring pipe, and a turntable for rotating said pipe, said turntable comprising cross-heads, shafts fixedly mounted in said cross-heads, disks revolubly mounted on said shafts, screws for moving said cross-heads simultaneously toward or from said pipe, and housings for said screws and said shafts protecting them from the dirt.

55. In a well sinking apparatus, the combination of a boring pipe, and a turntable for rotating said pipe, said turntable comprising cross-heads, shafts fixedly mounted in said cross-heads, disks revolubly mounted on said shafts and variably spaced apart thereon, screws passing through said cross-heads in the plane of said shafts adapted by their rotation to move said cross-heads simultaneously toward or from said pipe, and housings for said screws protecting them from the dirt.

56. In a well sinking apparatus, the combination of a boring pipe, and a turntable for rotating said pipe, said turntable comprising cross-heads, gripping devices mounted on said cross-heads, screws for moving said cross-heads toward and from said pipe, and means for locking said screws against rotation.

57. In a well sinking apparatus, the combination of a boring pipe, and a turntable for rotating said pipe, said turntable comprising cross-heads, gripping devices mounted on said cross-heads, screws for moving said cross-heads toward and from said pipe, and clamps adapted to be moved into operative engagement with said screws for holding them against rotation.

58. In a well sinking apparatus, the combination of a boring pipe, and a turntable for rotating said pipe, said turntable comprising cross-heads, gripping devices mounted on said cross-heads, screws for moving said cross-heads toward and from said pipe, and clamps adapted to be turned up out of position or to be turned down into operative engagement with said screws for holding them against rotation.

59. In a well sinking apparatus, the combination of a boring pipe, and a turntable for rotating said pipe, said turntable comprising cross-heads, gripping devices mounted on said cross-heads, screws for moving said cross-heads toward and from said pipe, housings for said screws adapted to protect them from the dirt, and clamps pivotally mounted on said housings adapted to be turned down into operative engagement with said screws for holding them against rotation.

60. In a well sinking apparatus, the combination of a boring pipe, and a turntable for rotating said pipe, said turntable comprising cross-heads, gripping devices mounted on said cross-heads, screws having angular heads for moving said cross-heads toward and from said pipe, and plates having sockets fitting the heads of said screws adapted to be brought into engagement with said heads for holding said screws against rotation.

61. In a well sinking apparatus, the combination of a boring pipe, a drill mounted on the lower end thereof, means for rotating said pipe, means for jumping the pipe, and manually controlled means for supporting said pipe to regulate the pressure upon the drill.

62. In a well sinking apparatus, the combination of a boring pipe, a drill mounted on the lower end thereof, means for rotating said pipe, means for jumping the pipe, and other means for supporting said pipe to regulate the pressure upon the drill, said last-named means comprising a hand-wheel adapted to be manipulated to regulate the speed at which the pipe can descend into the well.

63. In a well sinking apparatus, the combination of a boring pipe, a drill mounted on the lower end thereof, means for rotating said pipe, means for jumping the pipe, and other means for supporting said pipe to regulate the pressure upon the drill, said last-named means comprising a hand-wheel adapted to be manipulated to regulate the speed at which the pipe can descend into the well, said hand-wheel controlling mechanism being adapted to be automatically thrown out of operation by the application of power operated means to raise the boring pipe.

64. In a well sinking apparatus, the combination of a boring pipe, a drill mounted on the lower end thereof, means for rotating said pipe, means for jumping the pipe, and other means for supporting said pipe to regulate the pressure upon the drill, said last-named means comprising a drum, a cable having one end wound on said drum and connected to said boring pipe, and manually-controlled means for rotating said drum.

65. In a well sinking apparatus, the combination of a boring pipe, a drill mounted on the lower end thereof, means for rotating said pipe, means for jumping the pipe, and other means for supporting said pipe to regulate the pressure upon the drill, said last-named means comprising a drum, a cable having one end wound on said drum and connected to said boring pipe, and manually-controlled means for rotating said drum, said manually-controlled means for rotating the drum being adapted to be automatically thrown out of operative connection with said drum upon the application of power driven means thereto for rotating the drum to raise said boring pipe.

66. In a well sinking apparatus, the combination of a boring pipe, a drill mounted on the lower end thereof, means for rotating said pipe, means for jumping the pipe, and other means for supporting said pipe to regulate the pressure upon the drill, said last-named means comprising a drum, a cable having one end wound on said drum and connected to said boring pipe, a worm-gear rotatable with said drum, and a worm adapted to mesh with said worm-gear for rotating the same.

67. In a well sinking apparatus, the combination of a boring pipe, a drill mounted on the lower end thereof, means for rotating said pipe, means for jumping the pipe, and other means for supporting said pipe to regulate the pressure upon the drill, said last-named means comprising a drum, a cable having one end wound on said drum and connected to said boring pipe, a worm-gear rotatable with said drum, a worm adapted to mesh with said worm-gear for rotating the same, and a hand-wheel rotatable with said worm.

68. In a well sinking apparatus, the combination of a boring pipe, a drill mounted on the lower end thereof, means for rotating said pipe, means for jumping the pipe, and other means for supporting said pipe to regulate the pressure upon the drill, said last-named means comprising a drum, a cable having one end wound on said drum and connected to said boring pipe, a worm-gear rotatable with said drum, and a worm adapted to mesh with said worm-gear for rotating the same, said worm being slidable longitudinally of itself out of mesh with said worm-gear as the worm-gear rotates in the direction for raising said boring pipe.

69. In a well sinking apparatus, the combination of a boring pipe, a drill mounted on the lower end thereof, means for rotating said pipe, means for jumping the pipe, and other means for supporting said pipe to regulate the pressure upon the drill, said last-named means comprising a drum, a cable having one end wound on said drum and connected to said boring pipe, a worm-gear rotatable with said drum, a shaft revolubly mounted adjacent to said worm-gear, a hand wheel for rotating said shaft, a worm fixed on said shaft and adapted to mesh with said worm-gear and adapted to be slid with said shaft in one direction out of mesh with said worm-gear, and means for holding said worm against movement longitudinally of itself in the opposite direction.

70. In a well sinking apparatus, the combination of a stationary support having a central opening for the passage of a boring pipe, an elevator adapted to be applied to a section of boring pipe to support the pipe and to hold it against rotation relative to the elevator, and means for holding said elevator against rotation relative to said support.

71. In a well sinking apparatus, the combination of a stationary support having a central opening for the passage of a boring pipe, and an elevator adapted to be applied to a section of boring pipe to support the pipe and to hold it against rotation relative to the elevator, said support and said elevator being notched at their engaging surfaces to hold said elevator against rotation on said support.

72. In a well sinking apparatus, the combination of a stationary sleeve, a table mounted thereon and held against rotation relative thereto, said table being provided with a central hub through which a boring pipe is adapted to extend, and an elevator adapted to be applied to a section of boring pipe to support the pipe and to hold it against rotation relative to the elevator, said support and said hub being notched at their engaging surfaces to hold said elevator against rotation on said hub.

73. In a well sinking apparatus, the combination of a stationary sleeve, a rotary revolubly mounted thereon, a table mounted on said stationary sleeve and held against rotation thereby, an elevator adapted to be applied to a section of boring pipe to support the pipe and to hold it against rotation relative to the elevator, means for holding said elevator against rotation relative to said table, and means carried by said rotary for rotating another section of boring pipe for connecting it to said first-named section.

74. In a well sinking apparatus, the combination of a rotary, two horizontal bars spaced apart thereon, and a wrench adapted to be mounted on a section of pipe extending through said rotary, the handle of said wrench being adapted to extend between said horizontal bars for causing said pipe and said wrench to rotate with said rotary.

75. In a well sinking apparatus, the combination of a rotary, two vertical posts mounted on said rotary, two horizontal bars spaced apart on said posts, and a wrench adapted to be mounted on a section of pipe extending through said rotary, the handle of said wrench being adapted to extend between said horizontal bars for causing said pipe and said wrench to rotate with said rotary.

76. In a well sinking apparatus, the combination of a rotary having a central opening through which a section of boring pipe is adapted to pass, a plurality of vertical posts mounted on said rotary, a wrench adapted to grip a section of pipe extending through said rotary and adapted to be turned by contact with said posts, and crossbars for connecting said posts near their upper ends.

77. In a well sinking apparatus, the combination of a boring pipe, means for rotating said pipe, a drill mounted on the lower end of said pipe, and a reamer mounted on said pipe above said drill.

78. In a well sinking apparatus, the combination of a boring pipe, means for rotating said pipe, a drill mounted on the lower end of said pipe, and a reamer revolubly mounted on said pipe above said drill.

79. In a well sinking apparatus, the combination of a boring pipe, a drill mounted on the lower end thereof, means for rotating said pipe, and a toothed member carried by said pipe above said drill adapted to travel about the outer surface of the well for straightening and smoothing it as said pipe rotates.

80. In a well sinking apparatus, the combination of a boring pipe, a drill mounted on the lower end thereof, means for rotating said pipe, and a toothed member carried by said pipe above said drill adapted to roll about the outer surface of the well for straightening and smoothing it as said pipe rotates.

81. In a well sinking apparatus, the combination of a boring pipe, a drill mounted on the lower end thereof, means for gyrating the lower end of said boring pipe about said well, and a reamer mounted on said pipe above said drill adapted to contact the outer surface of the well as said pipe is gyrated.

82. In a well sinking apparatus, the combination of a boring pipe, a drill mounted on the lower end thereof, means for gyrating the lower end of said boring pipe about said well, and a toothed sleeve revolubly mounted on said pipe above said drill adapted to contact the outer surface of the well as said pipe is gyrated.

83. In a well sinking apparatus, the combination of a boring pipe, a drill mounted eccentrically relative to the lower end of said pipe, means for rotating said pipe, and a reamer mounted on said pipe above said drill adapted to contact the outer surface of the well as said pipe is rotated.

84. In a well sinking apparatus, the combination of a boring pipe, a drill mounted eccentrically relative to the lower end of said pipe, means for rotating said pipe, and a toothed sleeve revolubly mounted on said pipe above said drill adapted to contact the outer surface of the well to straighten and smooth it as said pipe is rotated.

MATTHEW T. CHAPMAN.

Witnesses:
W. H. De Busk,
Albert H. Adams.